United States Patent
Endo et al.

(10) Patent No.: US 10,747,221 B2
(45) Date of Patent: Aug. 18, 2020

(54) MOVING BODY, MOVING BODY CONTROL SYSTEM, AND MOVING BODY CONTROL METHOD

(71) Applicant: HITACHI, LTD., Tokyo (JP)

(72) Inventors: Hideki Endo, Tokyo (JP); Shoji Yunoki, Tokyo (JP); Hiroyuki Kubo, Tokyo (JP)

(73) Assignee: HITACHI, LTD., Tokyo (JP)

(*) Notice: Subject to any disclaimer, the term of this patent is extended or adjusted under 35 U.S.C. 154(b) by 250 days.

(21) Appl. No.: 15/909,384

(22) Filed: Mar. 1, 2018

(65) Prior Publication Data
US 2018/0275653 A1    Sep. 27, 2018

(30) Foreign Application Priority Data
Mar. 23, 2017  (JP) ................................. 2017-057427

(51) Int. Cl.
*G05D 1/00* (2006.01)
*G05D 1/02* (2020.01)
(Continued)

(52) U.S. Cl.
CPC ........... *G05D 1/0061* (2013.01); *B60W 30/00* (2013.01); *G01C 21/32* (2013.01);
(Continued)

(58) Field of Classification Search
CPC ... H04W 4/021; G05D 1/0061; G05D 1/0011; H04L 43/0829
See application file for complete search history.

(56) References Cited

U.S. PATENT DOCUMENTS 8,947,522 B1*  2/2015  Hickman ............... H04N 7/18
                                        348/114
9,220,086 B2* 12/2015  Wang ............... H04B 7/18506
(Continued)

FOREIGN PATENT DOCUMENTS

JP    2010-198260 A    9/2010
JP    2015-158467 A    9/2015
(Continued)

OTHER PUBLICATIONS

Japanese Office Action dated Apr. 7, 2020 for the Japanese Patent Application No. 2017-057427.

*Primary Examiner* — Kenneth J Malkowski
(74) *Attorney, Agent, or Firm* — Volpe and Koenig, P.C.

(57) ABSTRACT

A moving body, having: a movement control unit controls movement of the moving body; a storage unit stores map information and target object information pertaining to a degree of necessity for determining whether self-driving can be continued; a monitoring/control unit transmits information inquiring whether to continue self-driving if the moving body comes into close proximity with the target object; and a route calculation unit that selects as a movement route, from a plurality of routes, a route where the degree of necessity of determining whether self-driving can be continued has a small value, on the basis of the map information and the target object information If a control signal for controlling the moving body is received in response to an inquiry regarding continuing self-driving, the monitoring/control unit inputs the control signal to the movement control unit and the movement control unit executes driving control according to the control signal.

8 Claims, 27 Drawing Sheets

(51) Int. Cl.
*B60W 30/00* (2006.01)
*G01C 21/32* (2006.01)
*G01C 21/34* (2006.01)

(52) U.S. Cl.
CPC ....... *G01C 21/3453* (2013.01); *G05D 1/0011* (2013.01); *G05D 1/0022* (2013.01); *G05D 1/0055* (2013.01); *G05D 1/0274* (2013.01); *G05D 2201/0213* (2013.01)

(56) References Cited

U.S. PATENT DOCUMENTS

| | | |
|---|---|---|
| 10,479,362 B2 | 11/2019 | Goto et al. |
| 2004/0068366 A1* | 4/2004 | Nisiyama ........... G01C 21/3461 701/25 |
| 2014/0207535 A1* | 7/2014 | Stefan ................... G07C 5/008 705/7.42 |
| 2017/0010613 A1* | 1/2017 | Fukumoto ............ G05D 1/0088 |
| 2017/0232974 A1* | 8/2017 | Nishida ................ B60W 50/14 701/24 |
| 2017/0259820 A1 | 9/2017 | Takahashi |
| 2017/0357259 A1* | 12/2017 | Foster ..................... H04L 69/26 |
| 2018/0099676 A1 | 4/2018 | Goto et al. |

FOREIGN PATENT DOCUMENTS

| | | | | |
|---|---|---|---|---|
| JP | 2016-095831 A | | 5/2016 | |
| JP | 2016095831 A | * | 5/2016 | ........ B60W 50/0098 |
| JP | 2016-194813 A | | 11/2016 | |
| WO | 2016/038931 A1 | | 3/2016 | |

\* cited by examiner

LINK INFORMATION TABLE (AREA A)

| LINK ID | STARTING NODE ID | RELATIVE POSITION FROM STARTING NODE (NORTH/SOUTH) | RELATIVE POSITION FROM STARTING NODE (EAST/WEST) | ENDING NODE ID | RELATIVE POSITION FROM ENDING NODE (NORTH/SOUTH) | RELATIVE POSITION FROM ENDING NODE (EAST/WEST) | ASSOCIATED LANDMARK ID |
|---|---|---|---|---|---|---|---|
| 1 | 1 | NORTH 1.5 | 0 | 2 | NORTH 1.5 | 0 | - |
| 2 | 2 | SOUTH 1.5 | 0 | 1 | SOUTH 1.5 | 0 | - |
| 3 | 1 | 0 | WEST 1.5 | 3 | 0 | WEST 1.5 | 1,3 |
| 4 | 3 | 0 | EAST 1.5 | 1 | 0 | EAST 1.5 | 2 |
| 5 | 2 | 0 | WEST 1.5 | 4 | 0 | WEST 1.5 | 6 |
| 6 | 4 | 0 | EAST 1.5 | 2 | 0 | EAST 1.5 | - |
| 7 | 3 | NORTH 1.5 | 0 | 4 | NORTH 1.5 | 0 | 7 |
| 8 | 4 | SOUTH 1.5 | 0 | 3 | SOUTH 1.5 | 0 | 4 |
| 9 | 3 | 0 | WEST 1.5 | 5 | 0 | WEST 1.5 | 9 |
| 10 | 5 | 0 | EAST 1.5 | 3 | 0 | EAST 1.5 | 5,10 |
| 11 | 4 | 0 | WEST 1.5 | 6 | 0 | WEST 1.5 | - |
| 12 | 6 | 0 | EAST 1.5 | 4 | 0 | EAST 1.5 | 8 |
| 13 | 5 | NORTH 1.5 | 0 | 6 | NORTH 1.5 | 0 | - |
| 14 | 6 | SOUTH 1.5 | 0 | 5 | SOUTH 1.5 | 0 | - |

Fig. 9

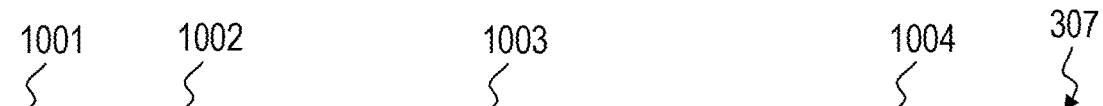

LANDMARK POSITION INFORMATION TABLE (AREA A)

| LANDMARK ID | ASSOCIATED LINK ID | LANDMARK TYPE | LANDMARK POSITION (DISTANCE FROM ASSOCIATED LINK STARTING POSITION)[m] |
|---|---|---|---|
| 1 | 3 | REDUCED SPEED AREA | 40 |
| 2 | 4 | REDUCED SPEED AREA | 30 |
| 3 | 3 | HIGH ACCIDENT INCIDENCE AREA | 100 |
| 4 | 8 | HIGH ACCIDENT INCIDENCE AREA | 100 |
| 5 | 10 | HIGH ACCIDENT INCIDENCE AREA | 100 |
| 6 | 5 | TRAFFIC LIGHT | 100 |
| 7 | 7 | TRAFFIC LIGHT | 100 |
| 8 | 12 | TRAFFIC LIGHT | 100 |
| 9 | 9 | SCHOOL, ETC. NEARBY | 20 |
| 10 | 10 | SCHOOL, ETC. NEARBY | 80 |

*Fig. 10*

EXAMPLE 1 OF LANDMARK MONITORING/CONTROL INFORMATION TABLE

| LANDMARK TYPE | MONITORING/ CONTROL START POSITION [m] | MONITORING/ CONTROL END POSITION [m] | MONITORING/ CONTROL STANDARD TIME [s] | MONITORING/ CONTROL COST (TIME) |
|---|---|---|---|---|
| TRAFFIC LIGHT | -15 | 0 | 30 | 30 |
| REDUCED SPEED AREA | 0 | 30 | 10 | 10 |
| HIGH ACCIDENT INCIDENCE AREA | 90 | 100 | 20 | 20 |
| SCHOOL, ETC. NEARBY | 0 | 60 | 15 | 15 |

Fig. 11

EXAMPLE 2 OF LANDMARK MONITORING/CONTROL INFORMATION TABLE

| LANDMARK TYPE | MONITORING/ CONTROL START POSITION [m] | MONITORING/ CONTROL END POSITION [m] | CONTROL EXECUTION PROBABILITY | MONITORING/ CONTROL COST (PROBABILITY) |
|---|---|---|---|---|
| TRAFFIC LIGHT | -15 | 0 | 0.05 | 0.05 |
| REDUCED SPEED AREA | 0 | 30 | 0.01 | 0.01 |
| HIGH ACCIDENT INCIDENCE AREA | 90 | 100 | 0.02 | 0.02 |
| SCHOOL, ETC. NEARBY | 0 | 60 | 0.02 | 0.02 |

Fig. 12

EXAMPLE 3 OF LANDMARK MONITORING/CONTROL INFORMATION TABLE

| LANDMARK TYPE | MONITORING/ CONTROL START POSITION [m] | MONITORING/ CONTROL END POSITION [m] | MONITORING/ CONTROL STANDARD TIME [s] | CONTROL EXECUTION PROBABILITY | MONITORING/ CONTROL COST (TIME × PROBABILITY) |
|---|---|---|---|---|---|
| TRAFFIC LIGHT | -15 | 0 | 30 | 0.05 | 1.5 |
| REDUCED SPEED AREA | 0 | 30 | 10 | 0.01 | 0.1 |
| HIGH ACCIDENT INCIDENCE AREA | 90 | 100 | 20 | 0.02 | 0.4 |
| SCHOOL, ETC. NEARBY | 0 | 60 | 15 | 0.02 | 0.3 |

*Fig. 13*

EXAMPLE OF TRAVEL ROUTE FROM NODE ID 1 TO NODE ID 6

INFORMATION ACQUIRED FROM CAMERA
LANDMARK TYPE: TRAFFIC LIGHT

PRESENT VEHICLE DRIVING INFORMATION

INFORMATION ACQUIRED FROM CAMERA
LANDMARK TYPE: REDUCED SPEED AREA

【PRESENT VEHICLE DRIVING INFORMATION】

MOVING BODY, MOVING BODY CONTROL SYSTEM, AND MOVING BODY CONTROL METHOD

CLAIM OF PRIORITY

The present application claims priority from Japanese patent application JP2017-57427 filed on Mar. 23, 2017, the content of which is hereby incorporated by reference into this application.

BACKGROUND OF THE INVENTION

The present invention relates to a technique for controlling an autonomous moving body.

In recent years, self-driving techniques have been developed in order to provide an inexpensive and safe means of travel. In achieving complete self-driving in which a driver is not needed, it is necessary to deal with imperfections in recognition, decision-making, and control. In order to introduce imperfect self-driving vehicles at an early stage, methods have been considered such as one in which safety is ensured by monitoring and controlling self-driving vehicles from a remote center.

The techniques of JP 2010-198260 A (Patent Documents 1) and JP 2016-095831 A (Patent Documents 3) are methods for improving safety in an automobile. The technique of JP 2015-158467 A (Patent Document 2) is a method for computing the route of a self-driving vehicle.

SUMMARY OF THE INVENTION

An automobile that is driven by autonomous driving cannot be driven in a safe manner if the surroundings cannot be correctly recognized. If, for example, if the color of the traffic light cannot be correctly recognized, then the automobile might cross the intersection when it is not supposed to do so, which prevents safe driving. Patent Document 1 discloses a technique in which when an automobile enters a specific area, driving information of the automobile on which the device is present is transmitted to a center, and the center broadcasts warning information to nearby vehicles, thereby allowing safe driving to be realized. Patent Document 2 discloses a technique in which a cost table for self-driving is used in order to calculate the route with the lowest manual driving cost from start to finish. Patent Document 3 discloses a technique of stopping self-driving before the detection performance of a sensor decreases. By combining Patent Documents 1 to 3, it is possible to reduce the cost (time) of manual driving while improving safety during manual driving, but it is not possible to reduce the cost (time or the like) required for remote monitoring and control.

In order to solve at least one of the foregoing problems, a representative example of the present invention provides a moving body, comprising: a movement control unit that controls movement of the moving body; a storage unit that stores map information including information pertaining to links corresponding to roads and nodes connecting the links, and target object information that associates with each other the links, a target object, and an indicator that indicates a degree of necessity to determine whether self-driving of the moving body by the movement control unit can be continued; a monitoring/control unit that transmits information inquiring whether self-driving of the moving body can be continued if the moving body has come into close proximity to the target object; and a route calculation unit that selects as a movement route, from among a plurality of routes from a starting point to an ending point, a route in which the indicator that indicates the degree of necessity to determine whether self-driving of the moving body can be continued has a small value, on the basis of the map information and the target object information, wherein, if in response to an inquiry as to whether the moving body can continue self-driving, a response including a control signal for controlling the moving body has been received, the monitoring/control unit inputs the control signal to the movement control unit and causes the movement control unit to execute driving control of the moving body according to the control signal, and wherein, if in response to an inquiry as to whether the moving body can continue self-driving, a response including a control signal for controlling the moving body has not been received, the monitoring/control unit causes the movement control unit to continue self-driving of the moving body on the selected movement route.

According to one aspect of the present invention, in a self-driving system that monitors/controls a self-driving vehicle remotely, it is possible to reduce the cost (communication costs as well as labor costs for remote monitoring personnel, for example) required for remote monitoring and control while ensuring safety. Problems, configurations, and effects other than what was described above are made clear by the description of embodiments below.

BRIEF DESCRIPTION OF THE DRAWINGS

FIG. 9 is a descriptive view showing a link information table of the area A stored by the self-driving vehicle according to Embodiment 1 of the present invention.

FIG. 10 is a descriptive view showing a landmark position information table of the area A stored by the self-driving vehicle according to Embodiment 1 of the present invention.

FIG. 11 is a descriptive view showing a configuration of a first example of a landmark monitoring/control information table stored by the self-driving vehicle according to Embodiment 1 of the present invention.

FIG. 12 is a descriptive view showing a configuration of a second example of the landmark monitoring/control information table stored by the self-driving vehicle according to Embodiment 1 of the present invention.

FIG. 13 is a descriptive view showing a configuration of a third example of the landmark monitoring/control information table stored by the self-driving vehicle according to Embodiment 1 of the present invention.

DETAILED DESCRIPTION OF EMBODIMENTS

Embodiments of the present invention will be explained with reference to drawings. In the embodiments of the present invention, an example is described in which the moving body is an automobile, the moving body may be anything that can move by autonomous driving. For example, the present invention can be applied to industrial robots, humanoid robots, drones, aircraft, helicopters, ships, submarines, and the like. Also, in the embodiments of the present invention, an example is described in which a moving body communicates through a wide area network with a remote monitoring/control server used in order to monitor and control the moving body remotely, but communication may be performed through only local networks.

Embodiment 1

Figure 1:
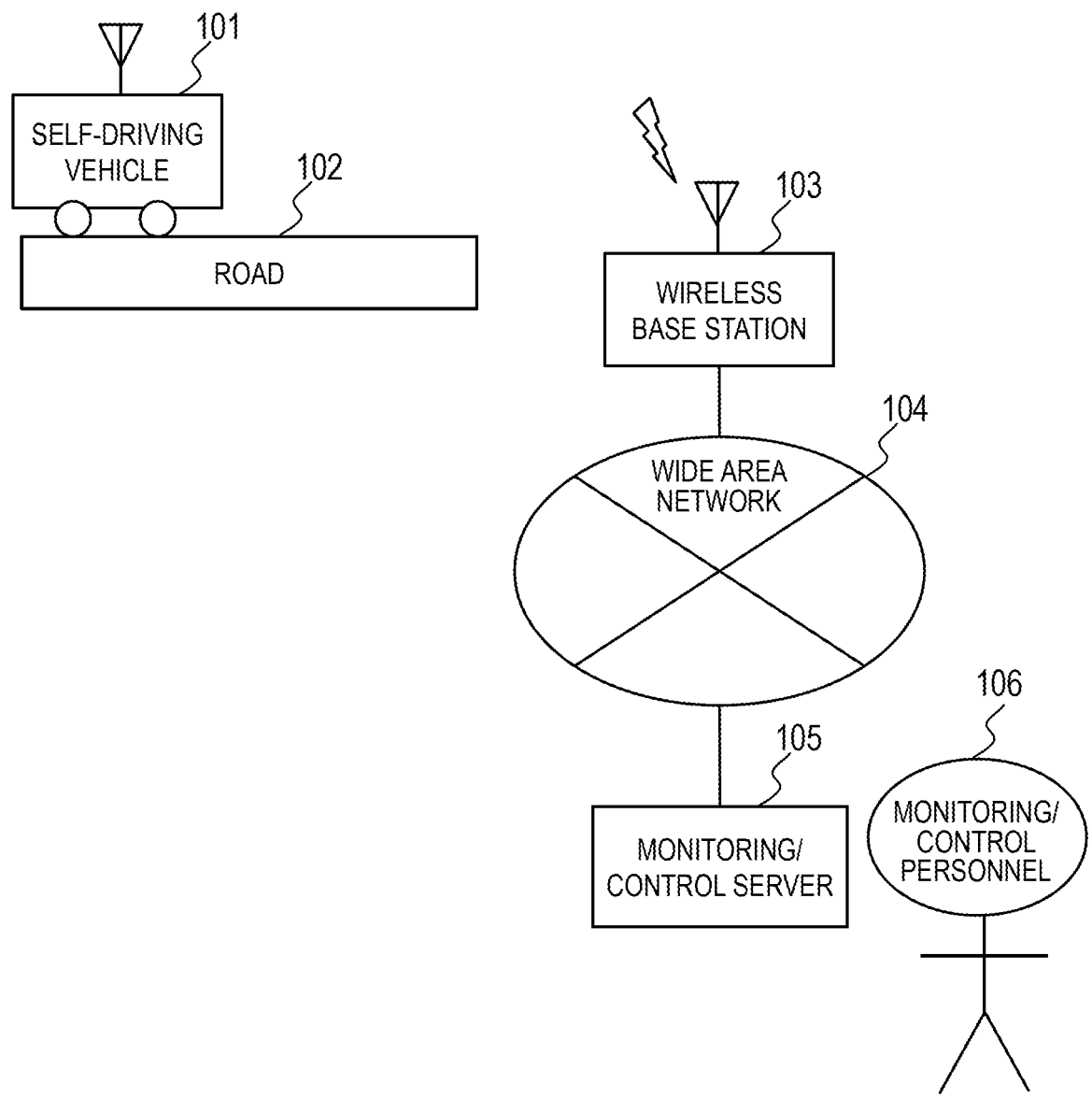
FIG. 1 is a descriptive view showing a self-driving vehicle monitoring/control system according to Embodiment 1 of the present invention.

FIG. 1 is a descriptive view showing a self-driving vehicle monitoring/control system according to Embodiment 1 of the present invention.

The self-driving vehicle monitoring/control system is constituted of a self-driving vehicle 101, a road 102, a wireless base station 103, a wide area network 104, a monitoring/control server 105, and monitoring/control personnel 106. FIG. 1 shows only one example, and there may be a plurality of each of the elements in the drawing. For example, there may be a plurality of self-driving vehicles 101 in a given self-driving vehicle monitoring/control system. In another example, there may be a plurality of monitoring/control servers 105 in a given self-driving vehicle monitoring/control system. The self-driving vehicle 101 is an automobile that is driven on the road 102. The self-driving vehicle 101 is driven on the road 102 by self-driving or remote control. The self-driving vehicle 101 connects to the monitoring/control server 105 through the wireless base station 103 and the wide area network 104. The wide area network 104 connects to the wireless base station 103 and the monitoring/control server 105. The monitoring/control server 105 displays information received from the self-driving vehicle 101. The monitoring/control server 105 transmits information inputted by the monitoring/control personnel 106 to the self-driving vehicle 101.

<Configuration of Self-Driving Vehicle 101>

Figure 2:
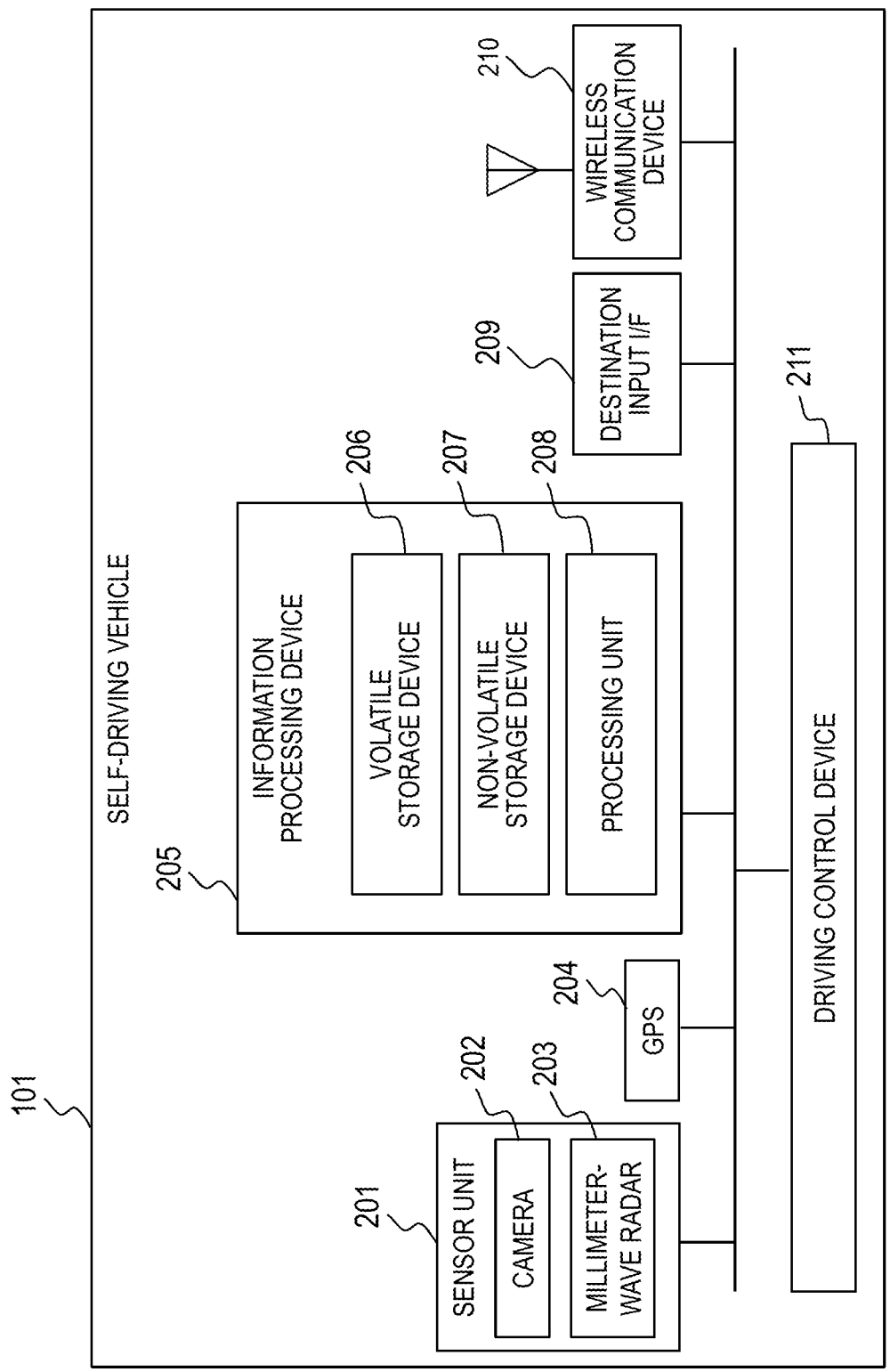
FIG. 2 is a block diagram showing a hardware configuration of a self-driving vehicle according to Embodiment 1 of the present invention.

FIG. 2 is a block diagram showing a hardware configuration of the self-driving vehicle 101 according to Embodiment 1 of the present invention.

The self-driving vehicle 101 is constituted of a sensor unit 201, a camera 202, a millimeter-wave radar 203, a GPS 204 (Global Positioning System), an information processing device 205, a volatile storage device 206, a non-volatile storage device 207, an processing unit 208, a destination input interface 209, a wireless communication device 210, and a driving control device 211.

The sensor unit 201 is used in order to acquire information of the surroundings of the self-driving vehicle 101. The sensor unit 201 is constituted of the camera 202 and the millimeter-wave radar 203. The sensor unit 201 may be constituted of a sensor other than what was described above such as LIDAR (Light Detection and Ranging, Laser Imaging Detection and Ranging). The sensor unit inputs the acquired sensor information to the information processing device 205. The camera 202 acquires image information of the surroundings of the self-driving vehicle 101. The millimeter-wave radar 203 detects the position of objects near the self-driving vehicle 101. The GPS 204 is used in order to acquire current position information of the self-driving vehicle 101.

The information processing device 205 is constituted of the volatile storage device 206, the non-volatile storage device 207, and the processing unit 208. The volatile storage device 206 is used in order to temporarily store programs to be executed by the processing unit 208. The non-volatile storage device 207 is used in order to store information long-term, and hard disks are an example thereof. The processing unit 208 is a device for performing various operation pertaining to data processing.

The destination input interface 209 is used in order to input the destination or the like of the self-driving vehicle 101. The wireless communication device 210 is used in order to communicate with the wireless base station 103. The driving control device 211 controls operations pertaining to driving such as acceleration, deceleration, and turning.

Figure 3:
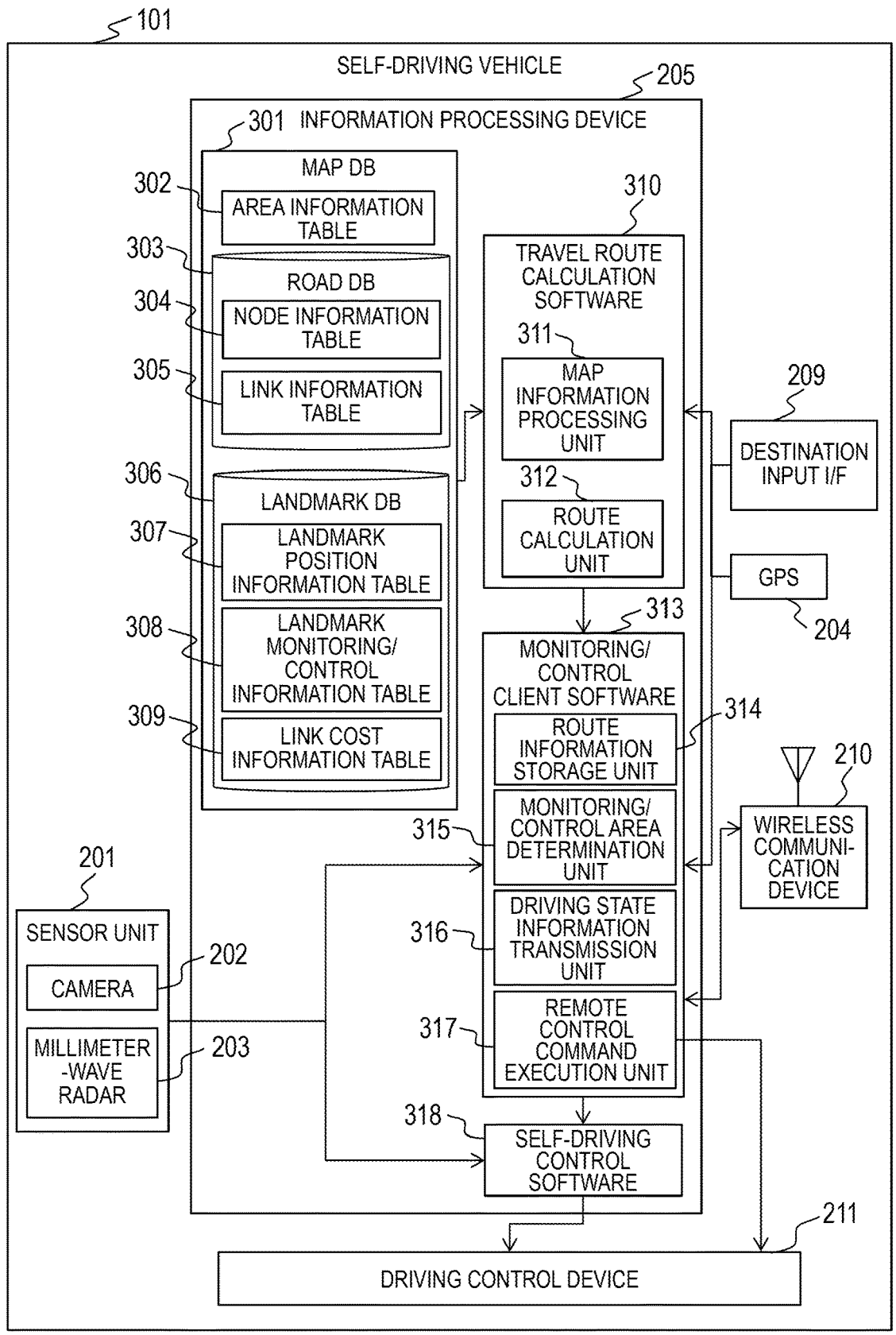
FIG. 3 is a block diagram showing the flow of data exchanged between various hardware constituting the self-driving vehicle, and the configuration of programs executed by an information processing device according to Embodiment 1 of the present invention.

FIG. 3 is a block diagram showing the flow of data exchanged between various hardware constituting the self-driving vehicle 101, as well as the configuration of programs executed by the information processing device 205 according to Embodiment 1 of the present invention.

A map DB 301 stores map information necessary for the self-driving vehicle 101 to be driven on the road. The map DB 301 is constituted of an area information table 302, a road DB 303, and a landmark DB 306. The area information table 302 stores the relationship between position information and a map corresponding to the position relationship stored in the map DB 301. A road DB 303 stores information relating to the road on which the self-driving vehicle 101 is driven. The road DB 303 is constituted of a node information table 304 and a link information table 305. The node information table 304 stores position information on the connection points (intersection) between roads, and information of the roads (links) connected to the connection points. The node information table 304 is a table prepared for each area defined in the area information table 302. The link information table 305 stores position information of the end points of the roads, and information such as width. The link information table 305 is a table prepared for each area defined in the area information table 302.

The landmark DB 306 stores information relating to the landmark 306 where the self-driving vehicle 101 should be monitored and controlled during driving. The landmark DB 306 is constituted of a landmark position information table 307, a landmark monitoring/control information table 308, and a link cost information table 309. The landmark position information table 307 stores information relating to the position where landmarks are disposed. The landmark monitoring/control information table 308 stores the types of landmarks, the range over which monitoring and control should occur for the landmarks, and the cost required for monitoring and control. The link cost information table 309 is a table associating each link with the cost required for monitoring and control. The link cost information table 309 is prepared for each area defined in the area information table 302.

A travel route calculation software 310 refers to the map DB 301 on the basis of the position information inputted from the destination input interface 209 and the GPS 204, and calculates the travel route to the destination. A map information processing unit 311 reads in information stored in the map DB 301 on the basis of the destination information inputted from the destination input interface 209 and the position information inputted from the GPS 204. A route calculation unit 312 calculates the travel route on the basis of the information read by the map information processing unit 311.

A monitoring/control client software 313 is a program that executes a process by which the monitoring/control server 105 monitors and controls a vehicle. The monitoring/control client software 313 is constituted of a route information storage unit 314, a monitoring/control area determination unit 315, a driving state information transmission unit 316, and a remote control command execution unit 317. The route information storage unit 314 stores road information and landmark information of the travel route calculated by the route calculation unit 312. The monitoring/control area determination unit 315 determines whether the current position of the self-driving vehicle 101 is inside a monitoring/control area on the basis of the information stored in the route information storage unit 314 and the position information inputted by the GPS 204, and inputs the determination results to the driving state information transmission unit 316. If the self-driving vehicle 101 has entered the monitoring/control area, the driving state information transmission unit 316 transmits the sensor information inputted from the sensor unit 201 to the monitoring/control server 105 through the wireless communication device 210. The remote control command execution unit 317 inputs the control information inputted from the wireless communication device 210 to a self-driving control software 318 or the driving control device 211.

The self-driving control software 318 generates a control signal such as for steering, acceleration, and deceleration on the basis of the travel route information stored in the monitoring/control client software 313 and controls the self-driving of the self-driving vehicle 101 by inputting the control signal to the driving control device 211. The driving control device 211 steers, accelerates, decelerates, or the like according to the control signal inputted from the self-driving control software 318 during self-driving, and when self-driving is not being carried out, the driving control device 211 steers, accelerates, decelerates, or the like according to the control signal inputted from the remote control command execution unit 317 or the like. In other words, when self-driving is being carried out, the self-driving control software 318 and the driving control device 211 can constitute a driving control unit of the self-driving vehicle 101.

Below, the processes executed according to the software in the self-driving vehicle 101 are sometimes indicated for ease of description as processes executed by the software (or a processing unit or the like included therein). However, in reality, these processes are executed by the processing unit 208 of the information processing device 205 by controlling the respective parts of the self-driving vehicle 101 as necessary according to commands indicated in the software stored in the volatile storage device 206 or the like.

<Configuration of Monitoring/Control Server 105>

Figure 4:
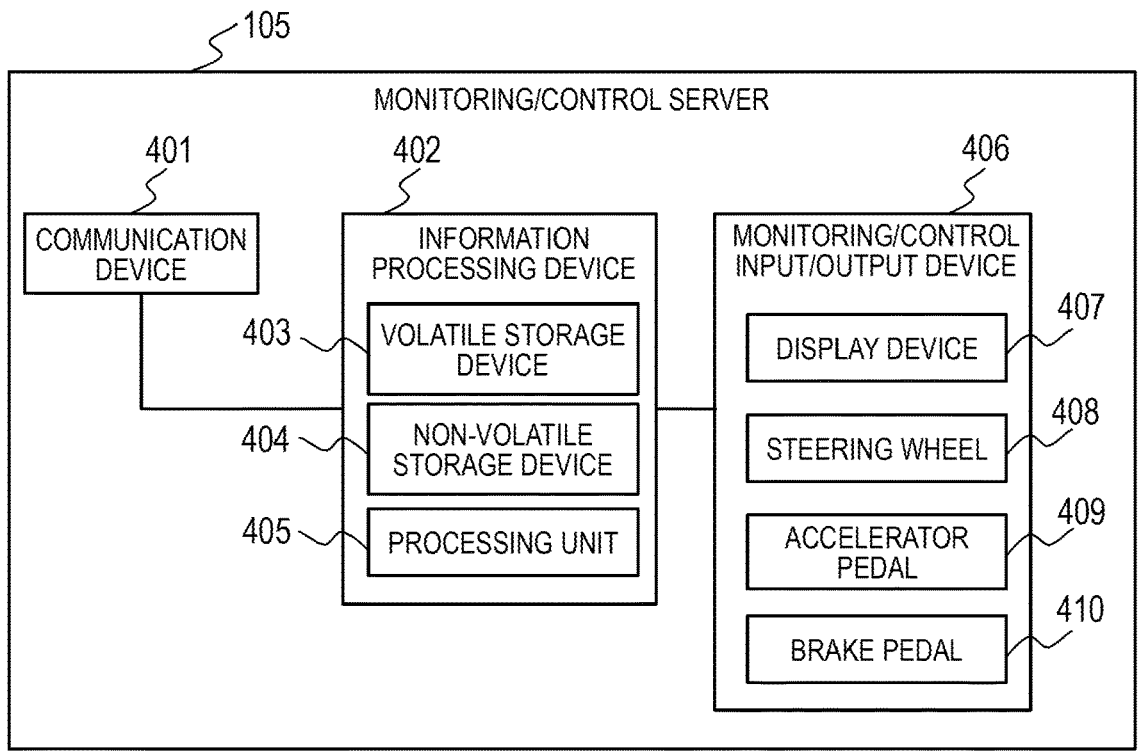
FIG. 4 is a block diagram showing a hardware configuration of a monitoring/control server according to Embodiment 1 of the present invention.

FIG. 4 is a block diagram showing a hardware configuration of the monitoring/control server 105 according to Embodiment 1 of the present invention.

A communication device 401 is connected to a wide area network 104 and communicates with the self-driving vehicle 101 through the wireless base station 103. An information processing device 402 is constituted of a volatile storage device 403, a non-volatile storage device 404, and an processing unit 405. The volatile storage device 403 is used in order to temporarily store programs to be executed by the processing unit 405. The non-volatile storage device 404 is used in order to store information long-term, and hard disks are an example thereof. The processing unit 405 is a device for performing various operation pertaining to data processing.

A monitoring/control input/output device 406 is a device for displaying information received from the self-driving vehicle 101 and for monitoring/control personnel to input information. The monitoring/control input/output device 406 is constituted of a display device 407, a steering wheel 408, an accelerator pedal 409, a brake pedal 410, and the like. The display device 407 is a device for displaying driving state information received from the self-driving vehicle 101. The steering wheel 408 is a device used by the monitoring/control personnel 106 to steer the self-driving vehicle 101. The accelerator pedal 409 is a device used by the monitoring/control personnel 106 for acceleration of the self-driving vehicle 101. The brake pedal 410 is a device used by the monitoring/control personnel 106 for deceleration of the self-driving vehicle 101.

Figure 5:
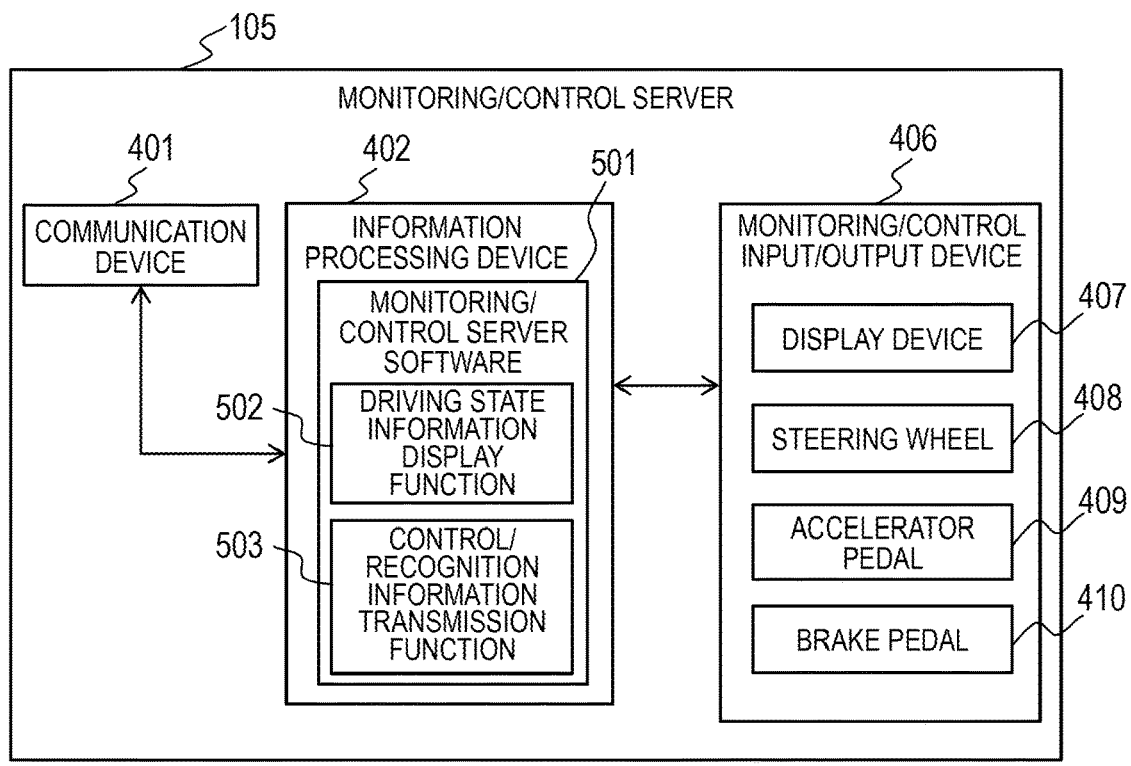
FIG. 5 is a block diagram showing the flow of data exchanged between various hardware constituting the monitoring/control server, and the configuration of programs executed by an information processing device according to Embodiment 1 of the present invention.

FIG. 5 is a block diagram showing the flow of data exchanged between various hardware constituting the monitoring/control server 105, as well as the configuration of programs executed by the information processing device 402 according to Embodiment 1 of the present invention.

A monitoring/control server software 501 is a program executed in the information processing device 402. The monitoring/control server software 501 is a program that causes the processing unit 405 to execute processes pertaining to monitoring and control of the self-driving vehicle 101. The monitoring/control server software 501 is constituted of a driving state information display function 502 and a control/recognition information transmission function 503. The driving state information display function 502 is a function that receives driving state information of the self-driving vehicle 101 received from the communication device 401 and displays the driving state information in the display device 407. The control/recognition information transmission function 503 is a function that transmits information for controlling the self-driving vehicle 101 inputted from the monitoring/control input/output device 406 and information for supporting recognition and decision-making by the self-driving vehicle 101, to the self-driving vehicle 101 through the communication device 401.

Below, the processes executed according to the software in the monitoring/control server 105 are sometimes indicated for ease of description as processes executed by the software (or a processing unit or the like included therein). However, in reality, these processes are executed by the processing unit 405 of the information processing device 402 by controlling the respective parts of the monitoring/control server 105 as necessary according to commands indicated in the software stored in the volatile storage device 403 or the like.

<Map DB 301>

Below, details of the map DB 301 of the self-driving vehicle 101 will be explained.

Figure 6:
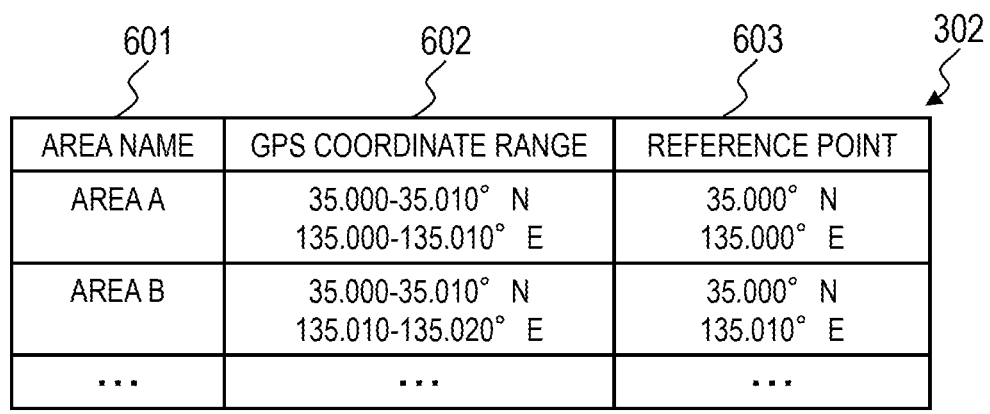
FIG. 6 is a descriptive view showing one example of an area information table stored by the self-driving vehicle according to Embodiment 1 of the present invention.

FIG. 6 is a descriptive view showing one example of an area information table 302 stored by the self-driving vehicle 101 according to Embodiment 1 of the present invention.

The area information table 302 is constituted of an area name 601, a GPS coordinate range 602, and a reference point 603. The area information table 302 is a table that associates position information with map information to be read. If the position information indicates 35.001° N latitude, 135.001° E longitude, for example, then a map of area A will be read in. The reference point of the map of area A is 35.000° N latitude, 135.000° E.

Figure 7:
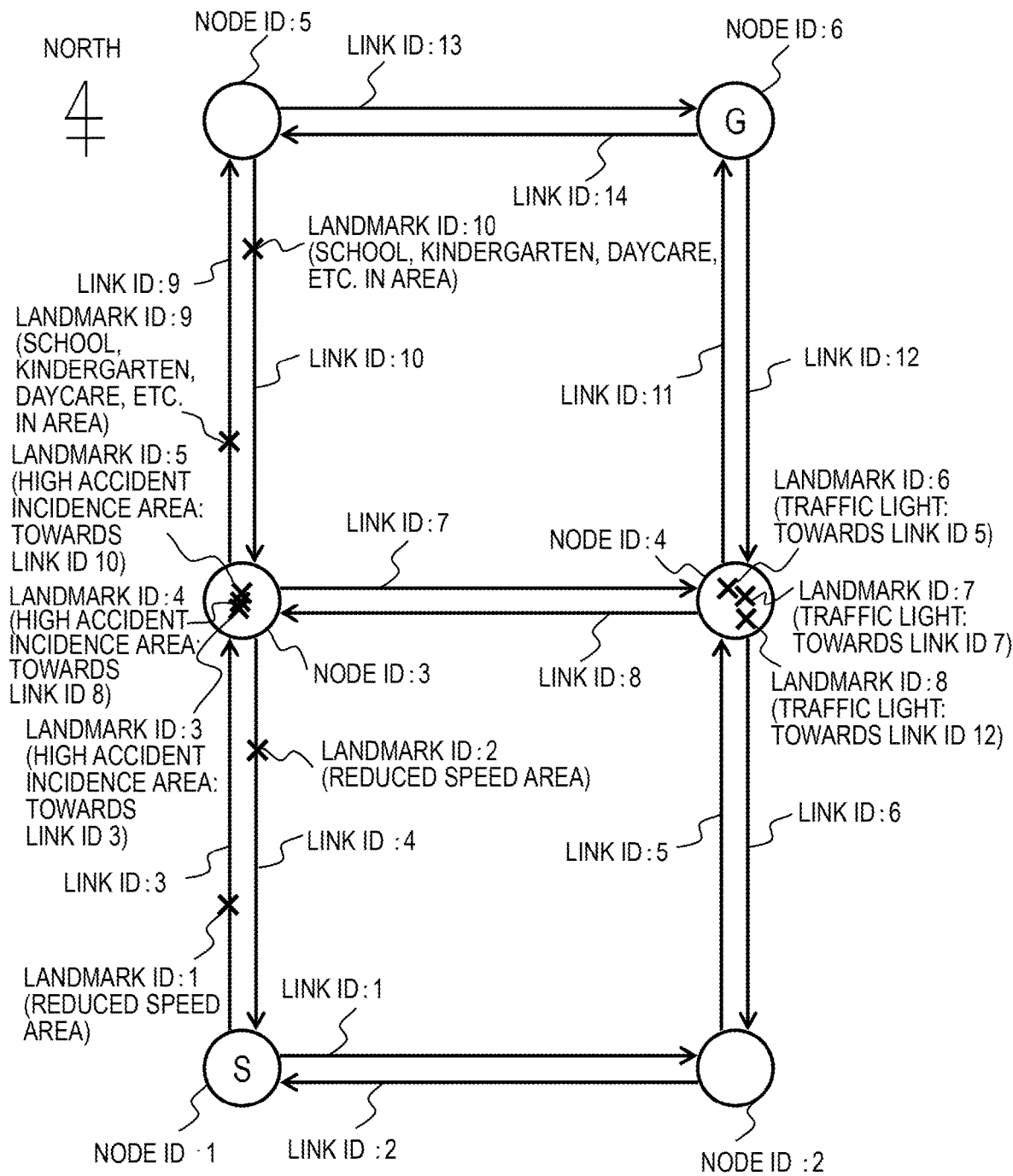
FIG. 7 is a descriptive view showing a configuration example of a portion of the map of area A stored by the self-driving vehicle according to Embodiment 1 of the present invention.

FIG. 7 is a descriptive view showing a configuration example of a portion of the map of area A stored by the self-driving vehicle 101 according to Embodiment 1 of the present invention.

The map is constituted of links corresponding to roads, nodes corresponding to connection points (intersections) between the roads, and landmarks. For example, the link from the node with an ID of 1 to the node with an ID of 2 is the link with an ID of 1. The link from the node with an ID of 2 to the node with an ID of 1 is the link with an ID of 2.

Figure 8:
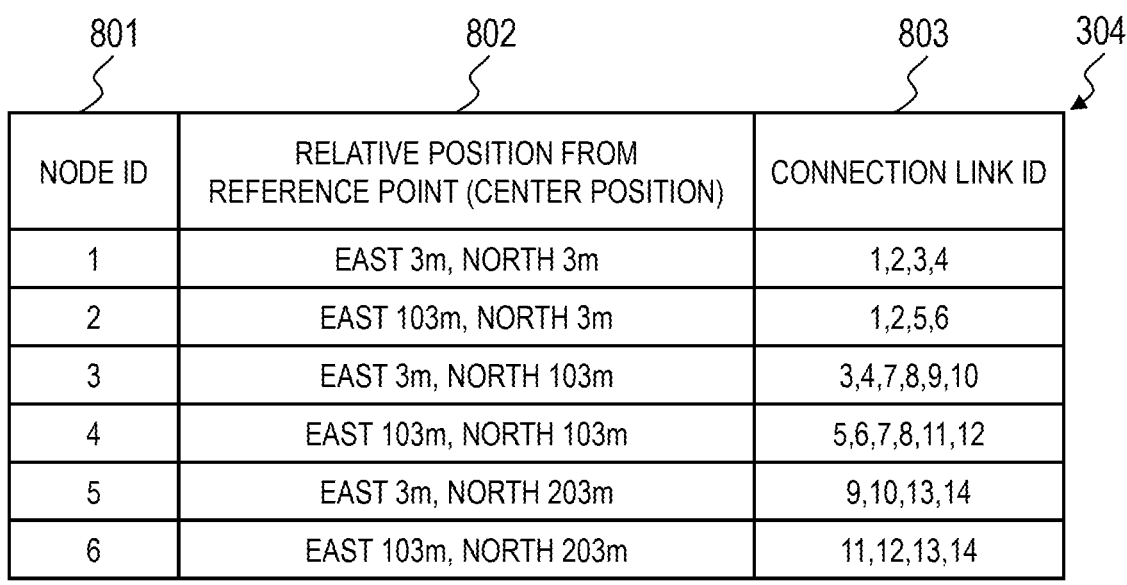
FIG. 8 is a descriptive view showing a node information table of the area A stored by the self-driving vehicle according to Embodiment 1 of the present invention.

FIG. 8 is a descriptive view showing a node information table 304 of the area A stored by the self-driving vehicle 101 according to Embodiment 1 of the present invention.

The node information table 304 is constituted of a node ID 801, a relative position 802 from the reference point, and a connection link ID 803. The node ID 801 represents an identifier (ID) of the node. The relative position 802 from the reference point indicates the relative position of the node for when the reference point of the area is used as a reference. According to the area information table 302 of FIG. 6, the reference point of the area A is 35.000° N, 135.000° E, and thus, if the node with an ID 1 has a reference point of 35.000° N, 135.000° E, for example, then the node is at a point 3 m to the east and 3 m to the north from the reference point. Also, the node with an ID of 1 is connected to a group of links with IDs of 1, 2, 3, and 4.

FIG. 9 is a descriptive view showing a link information table 305 of the area A stored by the self-driving vehicle 101 according to Embodiment 1 of the present invention.

The link information table 305 is constituted of a link ID 901, a starting node ID 902, a relative position (north/south) 903 from the starting node, a relative position (east/west) 904 from the starting point, an ending node ID 905, a relative position (north/south) 906 from the ending node, a relative position (east/west) 907 from the ending node, and an associated landmark ID 908.

The link ID 901 is an identifier of the link. The starting node ID 902 represents the ID of the starting node to which the link is connected. The relative position (north/south) 903 from the starting node represents the relative positional relationship in the north/south direction of the starting point coordinates of the link for when the position of the starting node connected to the link is set as a reference. The relative position (east/west) 904 from the starting node represents the relative positional relationship in the east/west direction of the starting point coordinates of the link for when the position of the starting node connected to the link is set as a reference. The ending node ID 905 represents the ID of the ending node to which the link is connected. The relative position (north/south) 906 from the ending node represents the relative positional relationship in the north/south direction of the ending point coordinates of the link for when the position of the ending node connected to the link is set as a reference. The relative position (east/west) 907 from the ending node represents the positional relationship in the east/west direction of the ending point coordinates of the link for when the position of the ending node connected to the link is set as a reference. The associated landmark ID 908 is the ID of a landmark on the link (that is, associated with the link).

For example, the ID of the node connected to the starting point of the link with an ID of 3 is 1. The coordinates of the starting point of the link ID 3 are 0 m north/south and 1.5 m west from the node with an ID of 1. The ID of the node connected to the ending point of the link with an ID of 3 is 3. The coordinates of the ending point of the link ID 3 are 0 m north/south and 1.5 m west from the node with an ID of 3. There are two landmarks on the link with an ID of 3 with IDs of 1 and 3.

FIG. 10 is a descriptive view showing a landmark position information table 307 of the area A stored by the self-driving vehicle 101 according to Embodiment 1 of the present invention.

The landmark position information table 307 is constituted of a landmark ID 1001, an associated link ID 1002, a landmark type 1003, and a landmark position 1004. The landmark ID 1001 indicates an identifier of the landmark. The landmark type 1003 represents the type of landmark. The associated link ID 1002 represents the ID of a link on which the landmark is set (that is, associated with the landmark). The landmark position 1004 represents the location of the position of the landmark as a distance from the starting point of the link where the landmark is placed.

The landmark of the present embodiment is a target object (feature or the like) that might be a cause for requiring remote monitoring of the surroundings of the self-driving vehicle 101 or a cause for requiring remote control of the self-driving vehicle 101, and may be a physical object such as a traffic signal or a road sign, or a virtually set location such as an area with a high incidence of accidents, for example. A landmark with an ID of 1 is set on a link with an ID of 3, for example. The type of landmark with the ID of 1 is reduced speed area. The landmark with an ID of 1 is set at a position 40 m from the starting point of the link with an ID of 3. The landmark DB 306 associates the landmark, the link, a range over which monitoring and control is executed with the landmark on the link being the cause, and the monitoring and control cost.

FIG. 11 is a descriptive view showing a configuration of a first example of the landmark monitoring/control information table 308 stored by the self-driving vehicle 101 according to Embodiment 1 of the present invention.

The landmark monitoring/control information table 308 is constituted of a landmark type 1101, a monitoring/control start position 1102, a monitoring/control end position 1103, a monitoring/control standard time 1104, and a monitoring/control cost 1105. The landmark type 1101 represents the type of landmark. The monitoring/control start position 1102 represents the position, where monitoring and control is started, in association with a landmark, represented as a position relative to where the landmark is located. The monitoring/control end position 1103 represents the position, where monitoring and control is ended, in association with a landmark, represented as a position relative to where the landmark is located. The monitoring/control standard time 1104 is the standard time required for monitoring and control associated with the landmark. The monitoring/control cost 1105 is the cost required for monitoring and control associated with the landmark. In the example of FIG. 11, the value of the monitoring/control standard time 1104 of the landmark is used as the monitoring/control cost 1105 of the landmark.

If the landmark type 1101 is a reduced speed area, for example, then monitoring and control is started at a position 0 m in the direction of the ending point from the starting point of the link (that is, the same position as where the landmark is located), with reference to the position where the landmark is located. Then monitoring and control is ended at a position +30 m in the direction of the ending point from the starting point of the link, with reference to the position where the landmark is located. In this case, the monitoring/control standard time is 10 s, and the monitoring/control cost is 10.

If the landmark type 1101 is a traffic light, for example, then monitoring and control is started at a position −15 m in the direction of the ending point from the starting point of the link (that is, a position 15 m to the front of where the landmark is located), with reference to the position where the landmark is located. By determining the range of the monitoring/control area according to the landmark type, it is possible to performing monitoring and control in a range appropriate to the properties of the landmark.

With reference to FIGS. 12 and 13, an example of the landmark monitoring/control information table 308 differing from that of FIG. 11 will be described.

FIG. 12 is a descriptive view showing a configuration of a second example of the landmark monitoring/control information table 308 stored by the self-driving vehicle 101 according to Embodiment 1 of the present invention.

The landmark monitoring/control information table 308 of FIG. 12, like the example of FIG. 11, is constituted of the landmark type 1101, the monitoring/control start position 1102, and the monitoring/control end position 1103, but unlike the example of FIG. 11, is also constituted of a control execution probability 1201, and a monitoring/control cost 1202. The control execution probability 1201 represents the probability that some manner of control will be executed remotely when monitoring and controlling the self-driving vehicle 101 in the vicinity of the landmark. The monitoring/control cost 1202 is the cost required for monitoring and controlling the self-driving vehicle 101 in the vicinity of the landmark. In the example of FIG. 12, the value of the control execution probability 1201 of the landmark is used as the monitoring/control cost 1202 of the landmark.

FIG. 13 is a descriptive view showing a configuration of a third example of the landmark monitoring/control information table 308 stored by the self-driving vehicle 101 according to Embodiment 1 of the present invention.

The landmark monitoring/control information table 308 of FIG. 13, like the example of FIG. 11, is constituted of the landmark type 1101, the monitoring/control start position 1102, the monitoring/control end position 1103, and the monitoring/control standard time 1104, and like the example of FIG. 12 is constituted of the control execution probability 1201, but unlike the examples of FIGS. 11 and 12, is also constituted of a monitoring/control cost 1301. The monitoring/control cost 1301 of FIG. 13 is a value calculated on the basis of the value of the monitoring/control standard time 1104 and the control execution probability 1201 (for example, a value attained by multiplying the monitoring/control standard time 1104 by the control execution probability 1201).

The monitoring/control cost may be calculated on the basis of any value as long as this value is information associated with the cost required for monitoring and control (the amount of work required by the monitoring/control personnel 106 for monitoring and control, for example). Also, the monitoring/control cost may be modified according to the weather and time period, for example.

The monitoring/control cost corresponding to each type of landmark is, as described above, an indicator representing the size of the cost required in order to monitor and control the driving of the self-driving vehicle 101 for each type of landmark. This monitoring/control cost is one example of an indicator that indicates the necessity of determining whether self-driving can continue. The higher the monitoring/control cost for a given landmark is, the greater the necessity is to determine whether self-driving should continue in the vicinity of the landmark. In the above example, the length of time that monitoring and control is to be performed (FIG. 11), the probability that remote control will actually be performed as a result of monitoring (FIG. 12), or a value attained by multiplying these values (FIG. 13) is used as the monitoring/control cost in the above examples, but besides these, an indicator that indicates the degree of necessity to determine whether self-driving can be continued may be used. The communication cost or the like between the self-driving vehicle 101 and the monitoring/control server 105 may be used, for example. By using such an index as described above, it is possible to appropriately select a route with the lowest monitoring/control cost.

Figure 14:
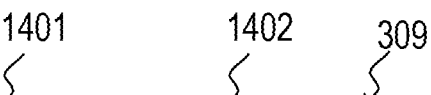
FIG. 14 is a descriptive view showing an example of a link cost information table of the area A stored by the self-driving vehicle according to Embodiment 1 of the present invention.

FIG. 14 is a descriptive view showing an example of a link cost information table 309 of the area A stored by the self-driving vehicle 101 according to Embodiment 1 of the present invention.

The link cost information table 306 is constituted of a link ID 1401, and a link cost 1402. The link ID 1401 is an identifier of the link. The link cost 1402 represents the monitoring/control cost for when the self-driving vehicle 101 drives on the link. If the monitoring/control cost 1105 shown in FIG. 11 is applied, for example, then the link with an ID of 3 has a link cost of 30. According to FIGS. 9 and 10, it can be seen that the link with an ID of 3 has a total of two landmarks with IDs of 1 and 3. It can be seen from FIG. 11 that the monitoring/control cost 1105 is 10 for the "reduced speed" landmark type 1101 with a landmark ID of 1. It can be seen from FIG. 11 that the monitoring/control cost 1105 is 20 for the "high accident incidence area" landmark type 1101 with a landmark ID of 3. Based on the above, the link cost of the link with an ID of 3 is 30, which is the sum of the monitoring/control cost of 10 for the landmark ID of 1 and the monitoring/control cost of 20 for the landmark ID of 3.

Figure 15:
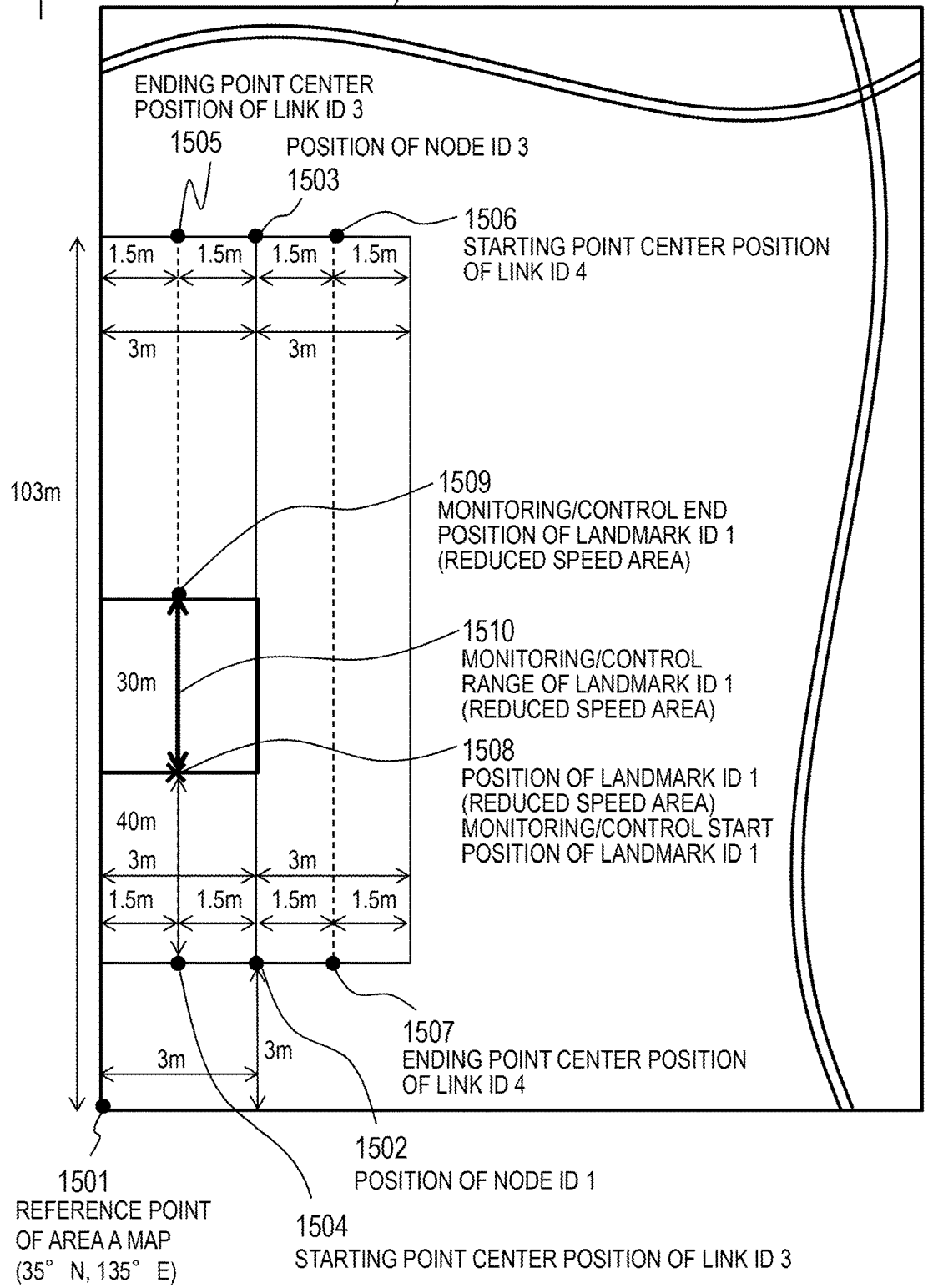
FIG. 15 is a descriptive view showing one example of a map created on the basis of information stored by the self-driving vehicle according to Embodiment 1 of the present invention.

FIG. 15 is a descriptive view showing one example of a map created on the basis of information stored by the self-driving vehicle 101 according to Embodiment 1 of the present invention.

Specifically, FIG. 15 represents a portion of the map A created on the basis of the information illustrated in FIGS. 6, 8, 9, 10, and 11. The reference point 1501 of the map of area A is at a point of 35° N, 135° E, according to FIG. 6. According to FIG. 8, the position 1502 of the node with an ID of 1 is a position that is 3 m to the east and 3 m to the north of the reference point. According to FIG. 8, the position 1503 of the node with an ID of 3 is a position that is 3 m to the east and 103 m to the north of the reference point. According to FIG. 9, the starting position 1504 of the link with an ID of 3 is 0 m in the north/south direction and 1.5 m to the west of the starting node with an ID of 1. According to FIG. 9, the ending position 1505 of the link with an ID of 3 is 0 m in the north/south direction and 1.5 m to the west of the ending node with an ID of 3. According to FIG. 9, the starting position 1506 of the link with an ID of 4 is 0 m in the north/south direction and 1.5 m to the east of the starting node with an ID of 4. According to FIG. 9, the ending position 1507 of the link with an ID of 4 is 0 m in the north/south direction and 1.5 m to the east of the ending node with an ID of 1. According to FIG. 10, the position 1508 of the landmark with an ID of 1 is a position 40 m from the starting position of the link with an ID of 3 in the direction towards the ending position. Also, the position 1508 of the landmark with an ID of 1 is the monitoring/control start position of the landmark with an ID of 1. That is, according to FIG. 11, the monitoring/control start position 1508 of the landmark with an ID of 1 is a position 0 m from the ending position of the link from the position of the landmark. According to FIG. 11, the monitoring/control end position 1509 of the landmark with an ID of 1 is a position 30 m from the ending position of the link from the position of the landmark. The monitoring/control area 1510 represents the range of the monitoring/control area related to the landmark with an ID of 1. This is a range related to the landmark with an ID of 1 over which the monitoring/control personnel 106 should perform monitoring, and is identified on the basis of the landmark position information table 307 and the landmark monitoring/control information table 308.

<Operation Flow of Travel Route Calculation Software 310>

Figure 16:
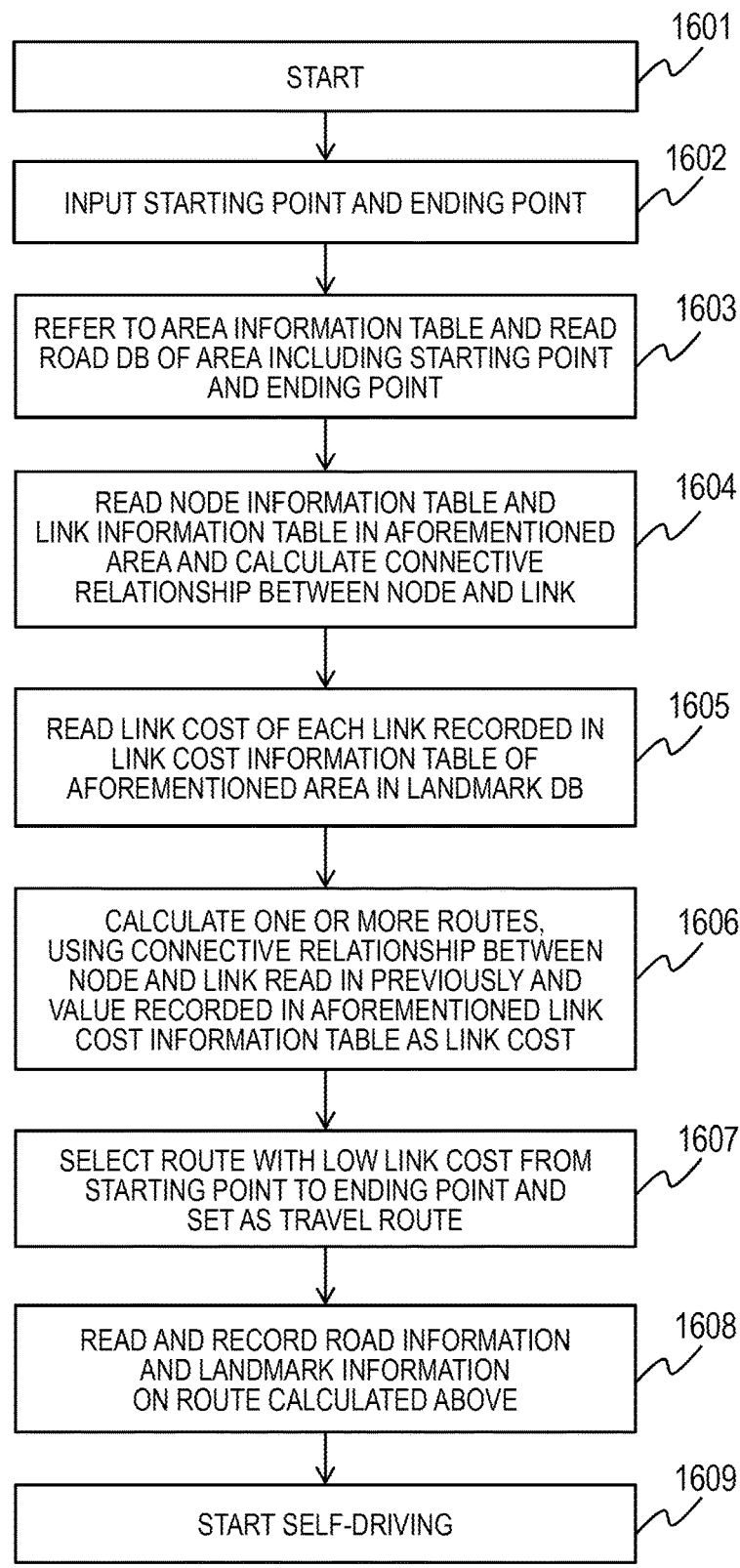
FIG. 16 is a flowchart showing route calculation by a travel route calculation software of the self-driving vehicle according to Embodiment 1 of the present invention.

FIG. 16 is a flowchart showing route calculation by the travel route calculation software 310 of the self-driving vehicle 101 according to Embodiment 1 of the present invention.

When the travel route calculation software 310 is started (1601), the starting point and ending point are inputted (1602). The starting point and ending point may be inputted in any manner. For example, the current position of the self-driving vehicle 101 as measured by the GPS 204 may be inputted as the starting point, and the destination inputted through the destination input interface 209 by a passenger of the self-driving vehicle 101 may be inputted as the ending point. Next, the travel route calculation software 310 reads in a road DB 303 of an area included the inputted starting point and ending point (1603). Then, the travel route calculation software 310 reads the node information table 304 and the link information table 305 inside the area, and calculates the connective relationship between the nodes and the links (1604). Then, the travel route calculation software 310 reads the link cost of each link stored in the link cost information table 309 of the area in the landmark DB 306 (1605).

Next, the travel route calculation software 310 uses the connective relationship between the read in nodes and links as well as the link cost value, and calculates one or more paths including one or more links from the inputted starting point to the ending point, and calculates the total link cost of each path (1606). Then, the travel route calculation software 310 selects the route with low link cost from the starting point to the ending point as the travel route (1607). Then, the travel route calculation software 310 reads the road information and the landmark information on the path calculated as described above, and records the information (1608). When the above process ends, the self-driving vehicle 101 starts self-driving (1609).

The calculation steps will be described using as an example a case in which the starting point is the node with an ID of 1 in FIG. 7 and the ending point is a node with an ID of 6. In step 1602, the coordinates of the node with an ID of 1 are inputted as 35.00002704° N, 135.00003286° E, and the coordinates of the node with an ID of 6 are inputted as 0.001830° N, 135.001128° E. According to the area information table 302 of FIG. 6, the coordinates of the node with an ID of 1 and the coordinates of the node with an ID of 6 are in the range of area A, and thus, the travel route calculation software 310 reads the road DB of area A. Specifically, the travel route calculation software 310 reads the table in FIG. 8 as the node information table 304 of area A and the table in FIG. 9 as the link information table 305 of area A, and calculates the connective relationship between the nodes and the links (1604).

Next, the travel route calculation software 310 refers to the landmark DB 306, reads the table in FIG. 14 as the link cost information table 309 of area A, and calculates the link cost 1402 (1605). Then, the travel route calculation software 310 calculates the connective relationship between the links and nodes calculated in step 1604, and uses the link cost read in during step 1605 to calculate one or more travel routes and the total link cost of each travel route.

Figure 17:
FIG. 17 is a descriptive view showing one example of calculation results for travel routes for the self-driving vehicle according to Embodiment 1 of the present invention.

FIG. 17 is a descriptive view showing one example of calculation results for travel routes for the self-driving vehicle 101 according to Embodiment 1 of the present invention.

The calculation results of the travel route shown in FIG. 17 are constituted of a travel route 1701 and a route total link cost 1702. The travel route 1701 is a collection of link IDs constituting each calculated travel route. The route total link cost 1702 is the total value of link costs corresponding to the respective link IDs on each travel route.

In the example of FIG. 17, four routes are calculated. The first travel route starts at the node with an ID of 1, and passes through links with IDs of 1, 5, and 11 in that order, ultimately reaching the node with an ID of 6. A landmark with a type "traffic light" is associated with the link with an ID of 5 constituting the travel route. When applying the monitoring/control cost 1105, the route total link cost 1702 of the travel route is 30.

The second travel route in the example of FIG. 17 starts at the node with an ID of 1, and passes through links with IDs of 1, 5, 8, 9, and 13 in that order, ultimately reaching the node with an ID of 6. A landmark with a type "traffic light" is associated with the link with an ID of 5 constituting the travel route, a landmark with a type "high accident incidence area" is associated with the link with an ID of 8, and a landmark with a type "school, etc. located nearby" is associated with the link with an ID of 9. When applying the monitoring/control cost 1105, the route total link cost 1702 of the travel route, which is the total monitoring/control cost 1105 of the landmarks is 65.

The route total link cost 1702 is calculated by a similar method for other travel routes as well.

Next, in step 1607, the travel route calculation software 310 selects the travel route passing through the link IDs 1, 5, and 11 as the path with the lowest link cost from the starting point to the ending point. In the present example, the route with the lowest link cost is selected, but the route with the lowest link cost need not necessarily be selected. For example, the travel route calculation software 310 may select one route that satisfies another standard (such as the route with the shortest estimated travel time, for example) from among a plurality of routes with a lower link cost than a prescribed reference value. In this manner, it is possible to select the lowest link cost route if minimizing the monitoring/control cost is of highest priority, and it is also possible to select an appropriate route while taking into consideration any other standards as necessary.

In step 1608, the travel route calculation software 310 reads the node information table of area A in FIG. 8, the link information table of area A in FIG. 9, the landmark position information table 307 of area A in FIG. 10, and the landmark monitoring/control information table 308 of FIG. 11, and records the tables as map information of the travel route selected in step 1607. In step 1609, self-driving is started on the basis of the calculated travel route.

<Operation Flow of Monitoring/Control Client Software 313>

Figure 18:
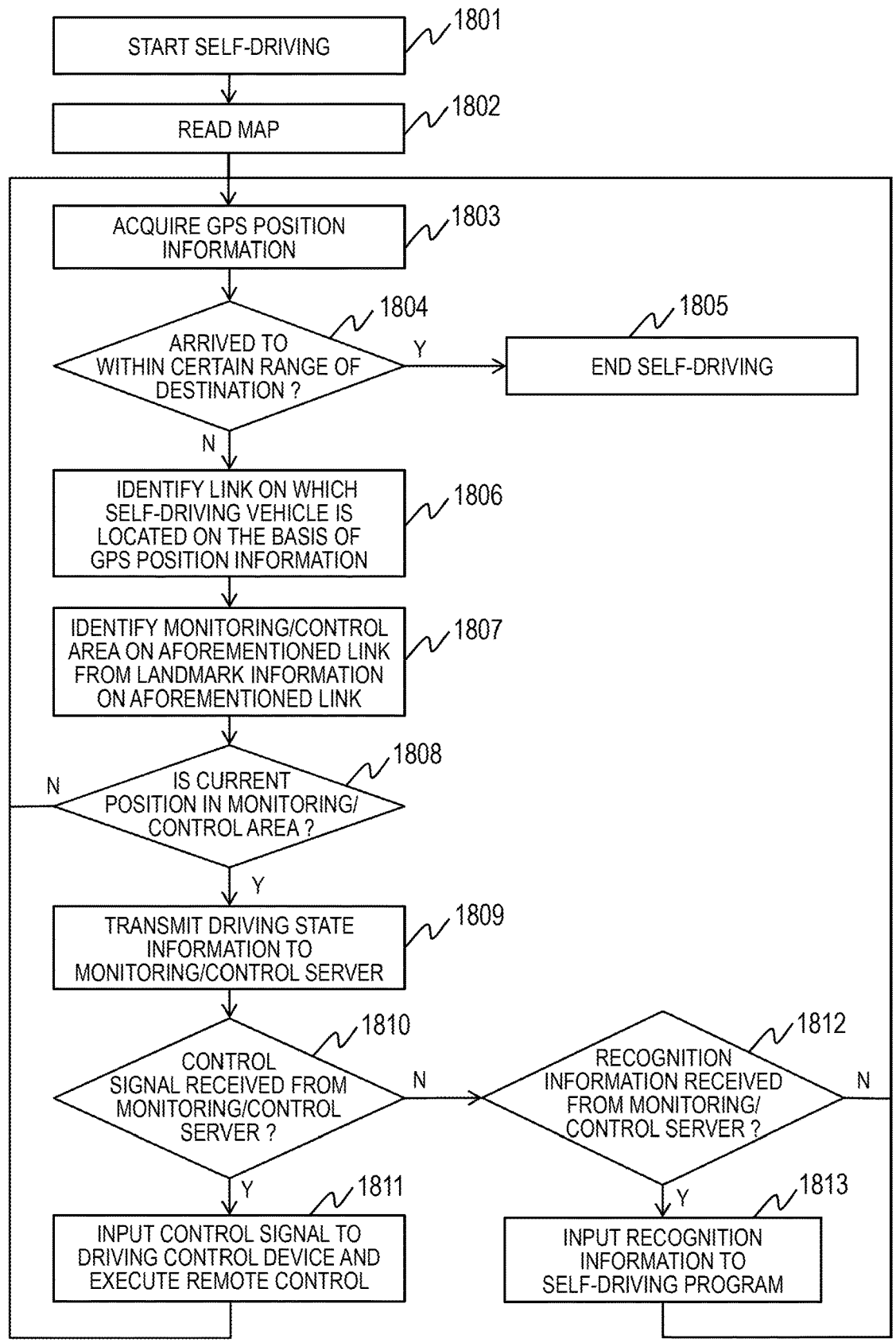
FIG. 18 is a flowchart showing the process by a monitoring/control client software after route calculation has been completed for the self-driving vehicle according to Embodiment 1 of the present invention.

FIG. 18 is a flowchart showing the process by the monitoring/control client software 313 after route calculation has been completed for the self-driving vehicle 101 according to Embodiment 1 of the present invention.

When the self-driving vehicle 101 starts self-driving (1801), the monitoring/control client software 313 reads in map information on the travel route (1802). Next, the monitoring/control client software 313 acquires the current position information of the self-driving vehicle using the GPS 204 (1803). Then, the monitoring/control client software 313 compares the destination position information to the current position information acquired as described above, and confirm whether the self-driving vehicle 101 has arrived to within a certain range of the destination (1804). If the answer from step 1804 is "yes", then it is determined that the self-driving vehicle 101 has reached the destination and self-driving is ended (1805).

If the answer from step 1804 is "no", then the monitoring/control client software 313 determines the link on which the self-driving vehicle 101 is being driven on the basis of the position information of the GPS 204 (1806). Next, the monitoring/control client software 313 refers to the landmark position information table 307 and the landmark monitoring/control information table 308 related to the links on which the self-driving vehicle 101 is being driven, and determines the monitoring/control area corresponding to the links on which the self-driving vehicle 101 is being driven (1807). Next, the monitoring/control client software 313 compares the current position information with the monitoring/control start position and the monitoring/control end position of the landmark monitoring/control information table 308, and confirms whether the current location is within the monitoring/control area (1808). If the current location is not within the monitoring/control area, this signifies that the self-driving vehicle 101 has not come into close proximity to the landmark to within a range for which monitoring and control is deemed necessary, and thus, the monitoring/control client software 313 returns to step 1803 and reacquires the GPS position information.

If the current location is within the monitoring/control area, this signifies that the self-driving vehicle 101 has come into close proximity to the landmark to within a range for which monitoring and control is deemed necessary, and thus, the monitoring/control client software 313 transmits the driving state information to the monitoring/control server 105 (1809). Next, the monitoring/control client software 313 confirms whether the control signal from the monitoring/control server 105 has been received (1810). If the control signal from the monitoring/control server 105 has been received, then the monitoring/control client software 313 inputs the received control signal in the driving control device 211 and executes remote control (1811).

Here, the control signal is a signal for remotely controlling the driving of the self-driving vehicle 101, and specifically includes signals that indicate at least one of steering, acceleration, deceleration, or the like, for example. In the present embodiment, the control signal is generated by the monitoring/control personnel 106 operating the steering wheel 408, the accelerator pedal 409, and the brake pedal 410. If a response including the control signal is received from the monitoring/control server 105, the monitoring/control client software 313 issues a command to stop self-driving to the self-driving control software 318, and the remote control command execution unit 317 inputs the received control signal to the driving control device 211 and causes driving control based on this control signal to be executed. The driving control device 211 performs steering, acceleration, deceleration, and the like of the self-driving vehicle 101 according to the inputted control signal. That is, the driving state information transmitted in step 1809 has the purpose of issuing an inquiry to the monitoring/control server 105 as to whether self-driving can be continued, and the fact that the self-driving vehicle 101 has received a response from the monitoring/control server 105 including the control signal signifies that a determination has been made not to continue self-driving.

The monitoring/control client software 313 confirms whether recognition information has been received from the monitoring/control server 105 if the control signal has not been received from the monitoring/control server 105 (1812). If the recognition information from the monitoring/control server 105 has been received, then the monitoring/control client software 313 inputs the received recognition information in the self-driving control software 318 (1803). The self-driving control software 318 continues self-driving using the inputted information. If the determination information has not been received from the monitoring/control server 105 in step 1812, then the self-driving control software 318 continues self-driving on the selected travel route, and the monitoring/control client software 313 returns to step 1803 and reacquires the GPS position information.

Here, the recognition information is information indicating the results of recognizing the state of the surroundings of the self-driving vehicle 101, and is used for self-driving by the self-driving vehicle 101. The recognition information is, for example, information on the state of the traffic light in front of the self-driving vehicle 101, the result of recognizing the state of pedestrians in the surrounding area, or the like. The self-driving control software 318 recognizes the state of the surroundings of the self-driving vehicle 101 on the basis of the information acquired from the sensor unit 201, and self-driving can be performed by inputting to the driving control device control signals generated as a result thereof. However, in cases such as if accurate recognition is difficult such as if there is a high susceptibility to errors in recognition, or if errors in recognition would result in serious consequences, the monitoring/control personnel 106 may perform recognition according to the driving state information, with the self-driving control software 318 using the results thereof to continue self-driving. As a result, a person can supplement recognition by the self-driving vehicle 101, thereby improving safety in the driving of the self-driving vehicle 101. The manner with which the driving of the self-driving vehicle 101 on the basis of the recognition information is controlled is left to the processes of the self-driving control software 318.

<Specific Example of Operation Flow of Monitoring/Control Client Software 313>

Figure 19:
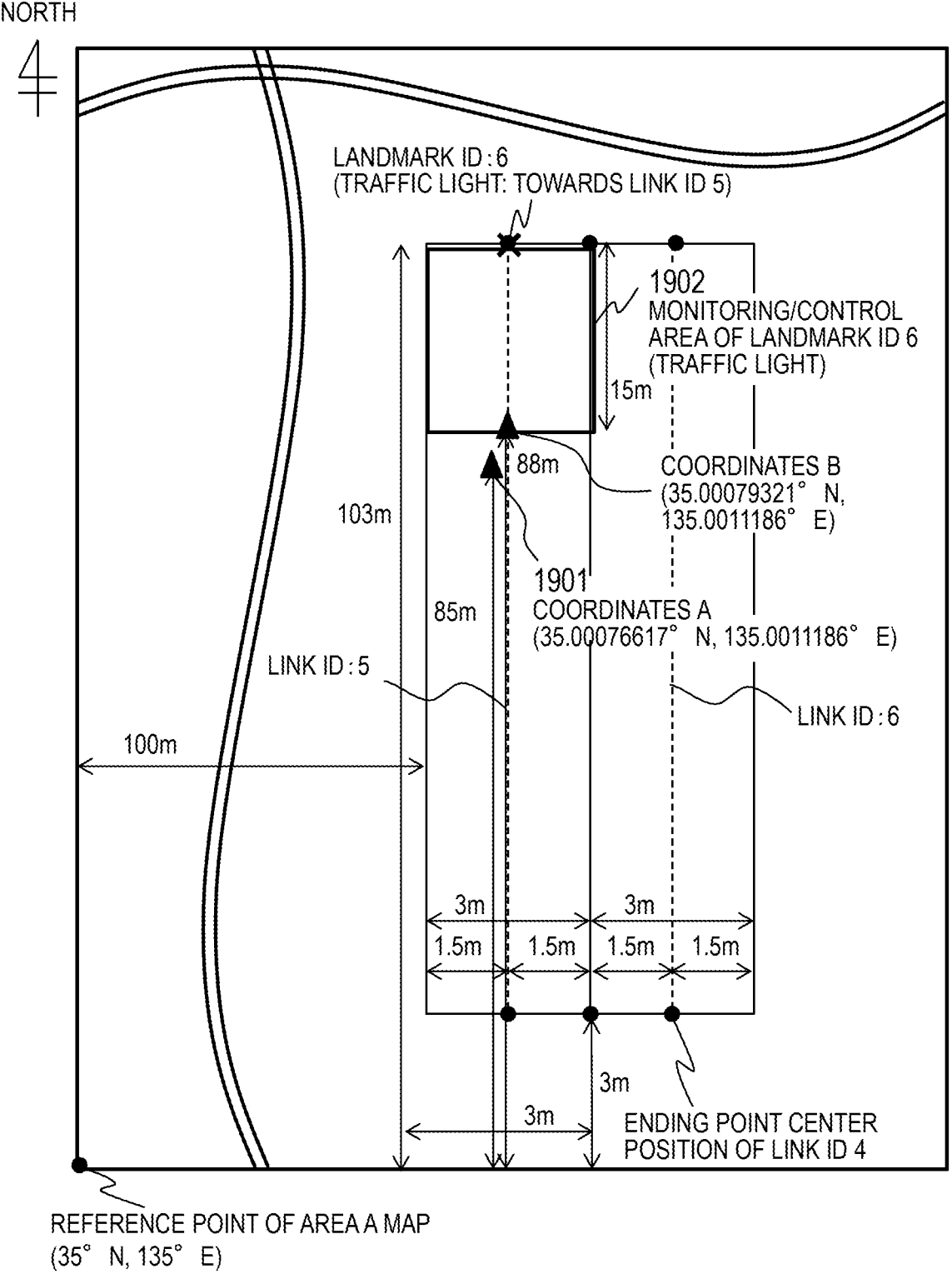
FIG. 19 is a descriptive view showing an example of the process by the monitoring/control client software of the self-driving vehicle according to Embodiment 1 of the present invention.

FIG. 19 is a descriptive view showing an example of the process by the monitoring/control client software 313 of the self-driving vehicle 101 according to Embodiment 1 of the present invention.

An example of the operation flow of the monitoring/control client software 313 of FIG. 18 will be described with reference to FIG. 19. Road information and landmark information recorded in step 1608 of FIG. 16 by the travel route calculation software is read during step 1802. In this example, the position information indicating the current position acquired in step 1803 is the coordinates A 1901 (35.00076617° N, 135.00111856° E). In step 1806, the monitoring/control client software 313 determines the link on which the current position is located. Here, at 35° N there are $9.013784 \times 10^{-6}$ degrees of latitude per meter, and at 35° N there are $1.095424 \times 10^{-5}$ degrees of longitude per meter. Based on the position information and the degrees of latitude and longitude per meter, it can be seen that the current position is 85 m $((35.00076617-35) \div (9.013784 \times 10^{-6}))$ to the north and 101.5 m $((135.0011186-135) \div (1.095424 \times 10^{-6}))$ to the east of the reference point of area A. Based on the node information table of FIG. 8 and the link information table of FIG. 9, it can be seen that the point on the coordinates A is a point on the link with an ID of 5 (1806).

Regarding the landmark related to the link with an ID of 5, it can be seen according to the landmark position information table of FIG. 10 that the traffic light with the landmark ID of 6, which is a landmark related to the link with an ID of 5, is at a distance 100 m away on the link with an ID of 5 from the position on that link. Also, it can be seen from the information pertaining to the traffic light of the landmark monitoring/control information table 308 of FIG. 11 that the area from a position 15 m to the front of the traffic light landmark to the traffic light landmark position (0 m) is the monitoring/control area 1902.

Next, it can be seen that the current coordinates A 1901 are not within the monitoring/control area of the coordinates A 1901, based on the fact that the coordinates A 1901 at the current position are 85 m north and 101.5 m east of the reference point of area A, and that the range of the monitoring/control area 1902 is 101.5 m east and 88 to 103 m north of the reference point of the map of area A.

Next, the process of step 1810 for a case in which the current coordinates are the coordinates B (35.00079321° N, 135.0011186° E) in FIG. 19 will be described. It can be seen that the coordinates B are 88 m $((35.00079321-35) \div (9.013784 \times 10^{-6}))$ to the north and 101.5 m $((135.0011186-135) \div (1.095424 \times 10^{-6}))$ to the east of the reference point of area A. The coordinates B are determined to be in the range of the monitoring/control area that is 101.5 to the east and 88 m to 103 m to the north of the reference point of the map of area A (1808), and step 1809 is executed. In step 1809, the monitoring/control client software 313 transmits, as driving state information to the monitoring/control server 105, a self-driving vehicle ID, which is an identifier of the self-driving vehicle 101, an image captured by the camera 202, the positions of surrounding objects detected by the millimeter-wave radar 203, position information acquired by the GPS 204, surrounding landmark information, and the like, for example. The monitoring/control client software 313 may transmit any of the information pertaining to the driving state of the self-driving vehicle 101. The monitoring/control personnel 106 can appropriately monitor the driving of the self-driving vehicle 101 in the vicinity of a landmark and, as necessary, remotely control the self-driving vehicle 101 by referring to such information.

Next, in step 1810, the monitoring/control client software 313 confirms whether the control signal from the monitoring/control server 105 has been received, and if so, proceeds to step 1811 and inputs the control signal to the driving control device 211 and executes remote control. Examples of such a control signal include an acceleration command, a deceleration command, a steering command, or the like, for example. If a maximum value deceleration command is inputted, for example, then the self-driving vehicle 101 can abruptly brake.

In step 1802, if the recognition information from the monitoring/control server 105 has been received, then the monitoring/control client software 313 inputs the recognition information to the self-driving program (1813). Here, recognition information includes such information as that indicating whether or not self-driving may continue, or that indicating whether the traffic light is currently green, red, or yellow. As long as the recognition information is information pertaining to decision-making or recognition to be executed by the self-driving control software 318, then any information, not limited to the above examples, may be used.

<Operation Flow of Monitoring/Control Server Software>

Figure 20:
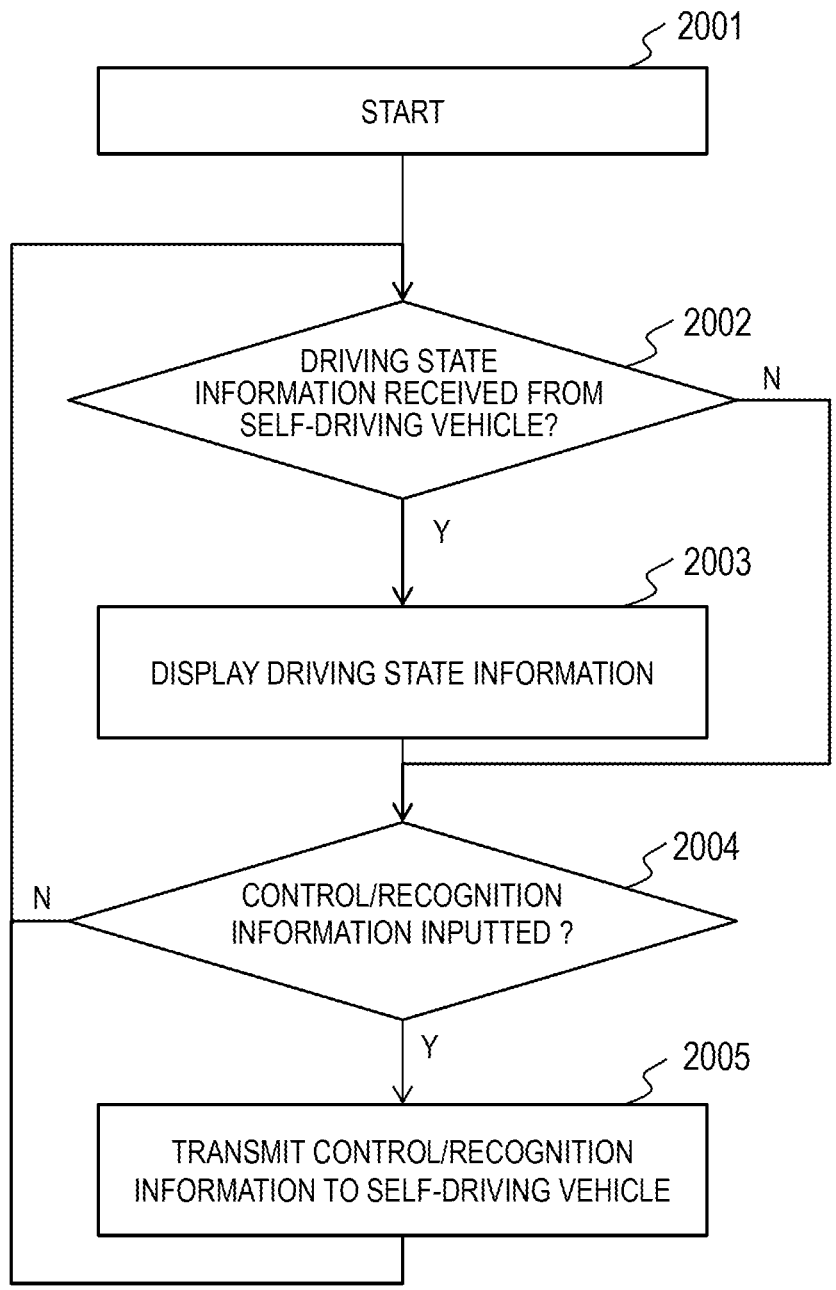
FIG. 20 is a flowchart showing the process by a monitoring/control server software of the monitoring/control server according to Embodiment 1 of the present invention.

FIG. 20 is a flowchart showing the process by the monitoring/control server software 501 of the monitoring/control server 105 according to Embodiment 1 of the present invention.

When the monitoring/control server software 501 is started up (2001), it is confirmed whether driving state information from the self-driving vehicle 101 has been received (2002). If driving state information from the self-driving vehicle 101 has not been received, then the process progresses to step 2004. If driving state information from the self-driving vehicle 101 has been received, then the monitoring/control server software 501 displays the driving state information in the monitoring/control input/output device 406 (2003). Next, the monitoring/control server software 501 confirms whether a control signal or recognition information from the monitoring/control input/output device 406 has been inputted (2004).

If an image to the front of the self-driving vehicle 101 captured by the camera 202 is displayed as driving state information in the display device 407, the image shows a red traffic light, and the monitoring/control personnel 106 accordingly operates the brake pedal 410, then information indicating that the brake pedal 410 has been operated is inputted as the control signal. Similarly, if the monitoring/control personnel 106 operates the steering wheel 408 or accelerator pedal 409 with reference to the driving state information, then information indicating such operations is inputted as the control signal. The input of such a control signal indicates that the monitoring/control personnel 106 has determined that the self-driving vehicle 101 should not continue self-driving and that self-driving should be stopped at least temporarily.

Alternatively, if the monitoring/control personnel 106, who has seen an image displayed by the display device 407, recognizes that the image is displaying a red traffic light, for example, then he/she may operate the monitoring/control input/output device 406 to input the recognition results as recognition information. Similarly, the monitoring/control personnel 106 may input, as recognition information, recognition results indicating that a pedestrian is crossing the street in front of the self-driving vehicle 101 or that there is an obstacle to the front.

If there is no input of a control signal or recognition information from the monitoring/control input/output device 406, then the process progresses to step 2002. If there is input of a control signal or recognition information from the monitoring/control input/output device 406, the monitoring/control server software 501 transmits the inputted information to the self-driving vehicle 101 (2005) and the process progresses to step 2002.

According to the present embodiment above, in a self-driving system that monitors/controls a self-driving vehicle remotely, it is possible to reduce the cost (communication costs as well as labor costs for remote monitoring personnel) required for remote monitoring and control while ensuring safety.

Embodiment 2

Embodiment 2 of the present invention will be described with reference to FIGS. 21 to 24. Aside from the differences described below, the various components of the system of Embodiment 2 have the same functions as the components of Embodiment 1 that are displayed in FIGS. 1 to 20 and that are assigned the same reference characters, and thus, descriptions thereof are omitted.

In the present embodiment, the configuration of the self-driving vehicle 101 and the monitoring/control server 105 differs from that of Embodiment 1.

Figure 21:
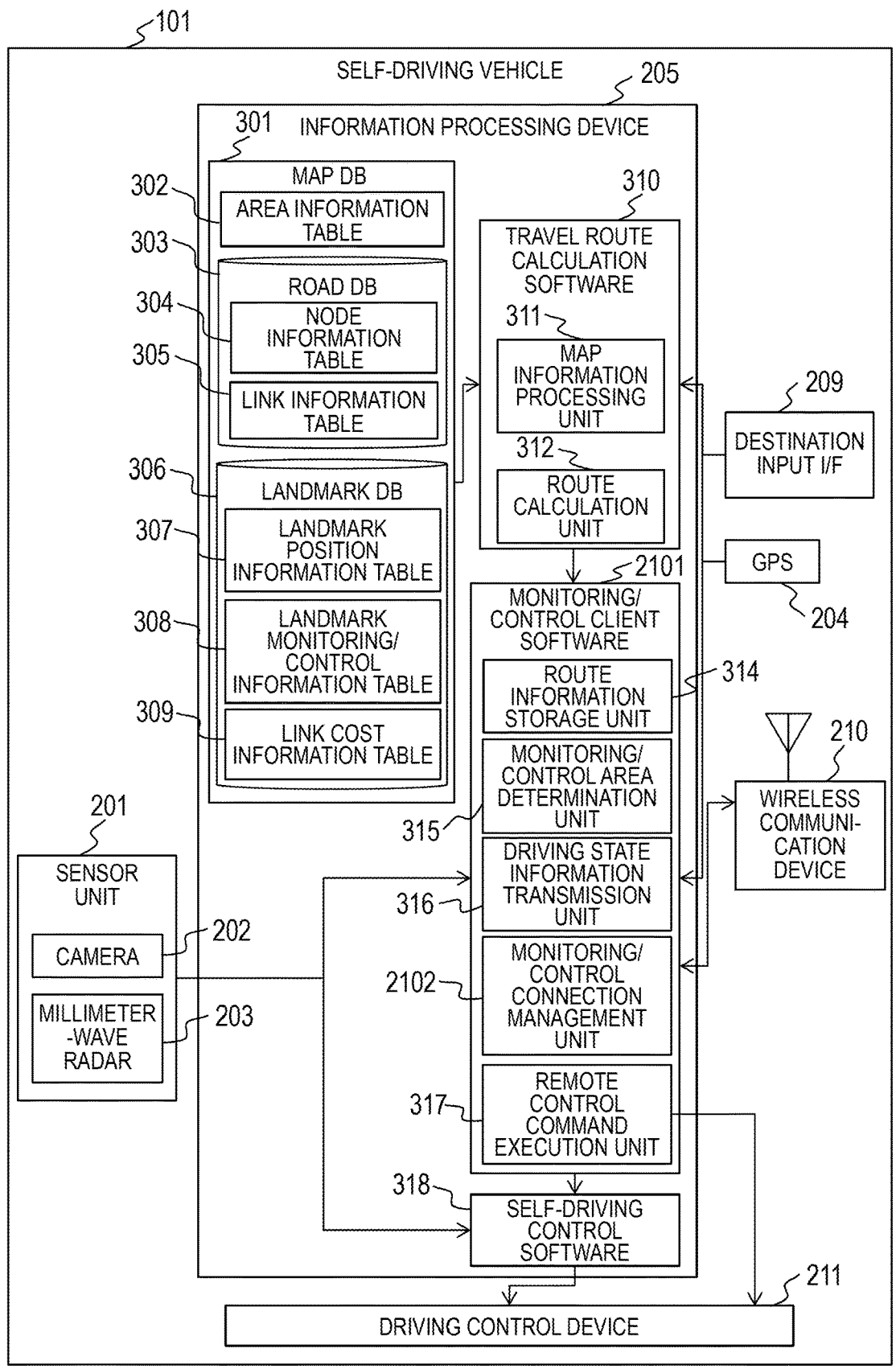
FIG. 21 is a block diagram showing a configuration of the self-driving vehicle according to Embodiment 2 of the present invention.

FIG. 21 is a block diagram showing a configuration of the self-driving vehicle 101 according to Embodiment 2 of the present invention.

Among the components of FIG. 21, portions that are the same as those of FIG. 3 are assigned the same reference characters as FIG. 3 and explanations thereof are omitted. The self-driving vehicle 101 of FIG. 21 has a monitoring/control client software 2101. The monitoring/control client software 2101 is constituted of a monitoring/control connection management unit 2102 in addition to a route information storage unit 314, a monitoring/control area determination unit 315, a driving state information transmission unit 316, and a remote control command execution unit 317. If the self-driving vehicle 101 has entered the monitoring/control area, the monitoring/control connection management unit 2102 transmits, to the monitoring/control server 105, a monitoring/control request for confirming whether it is possible for the monitoring/control server 105 to execute monitoring and control of the self-driving vehicle 101. The monitoring/control connection management unit 2102 performs control such that transmission of self-driving state information is started if the response from the monitoring/control server 105 to the transmitted monitoring/control request indicates that monitoring and control is possible, and such that if monitoring and control is not possible, then transmission of the self-driving state information is not started.

Figure 22:
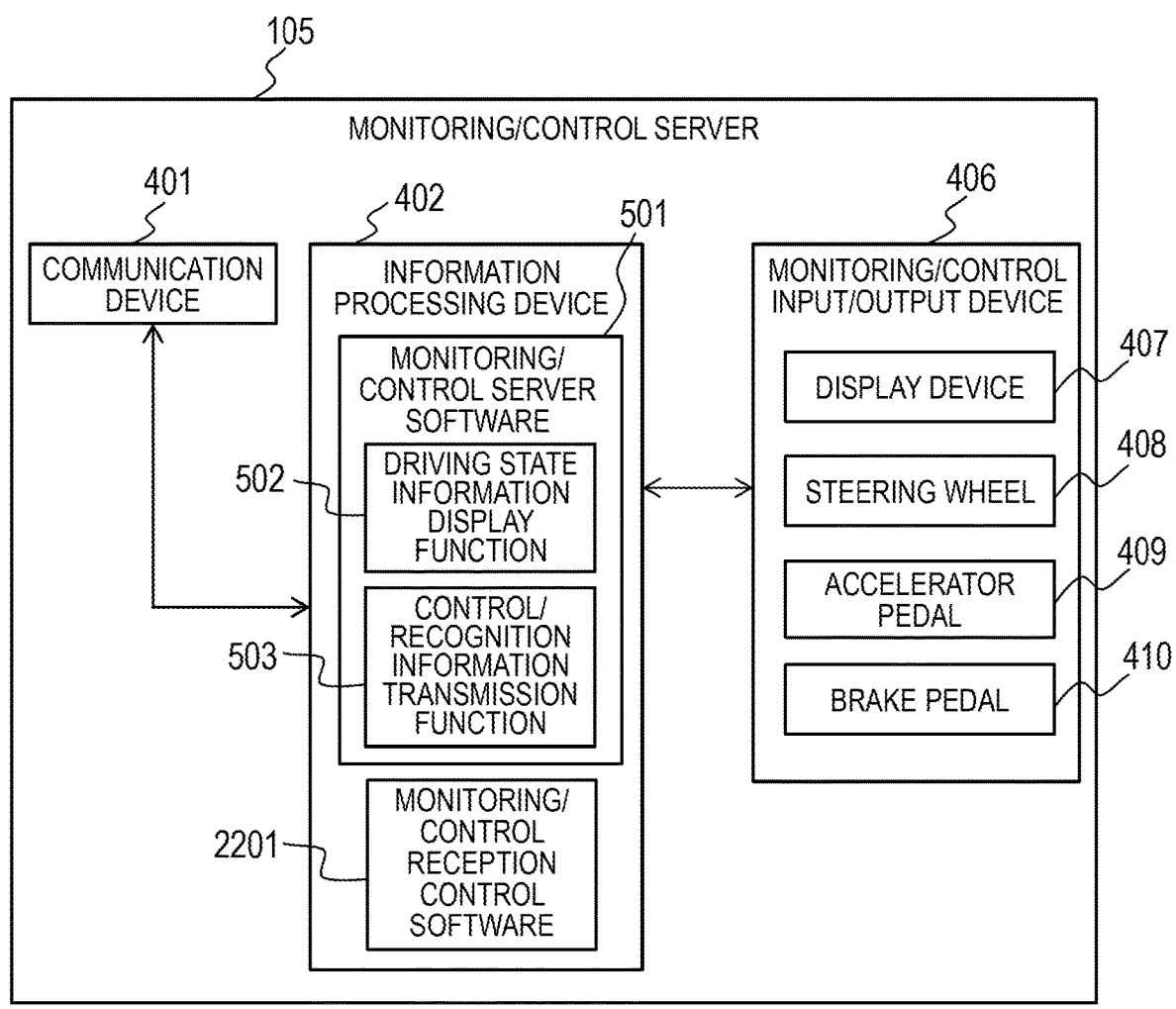
FIG. 22 is a block diagram showing a configuration of the monitoring/control server according to Embodiment 2 of the present invention.

FIG. 22 is a block diagram showing a configuration of the monitoring/control server 105 according to Embodiment 2 of the present invention.

Among the components of FIG. 22, portions that are the same as those of FIG. 4 are assigned the same reference characters as FIG. 4 and explanations thereof are omitted. The monitoring/control server 105 in FIG. 22 has a monitoring/control reception control software 2201. The monitoring/control reception control software 2201 determines, in response to the monitoring/control request transmitted if the self-driving vehicle 101 is in the monitoring/control area, whether monitoring and control is possible on the basis of the maximum monitoring/control capacity, the current monitoring/control capacity, and the monitoring/control cost of the self-driving vehicle 101 that transmitted the request, and transmits the information indicating whether monitoring and control is possible.

<Operation Flow of Monitoring/Control Client Software 2101>

Figure 23:
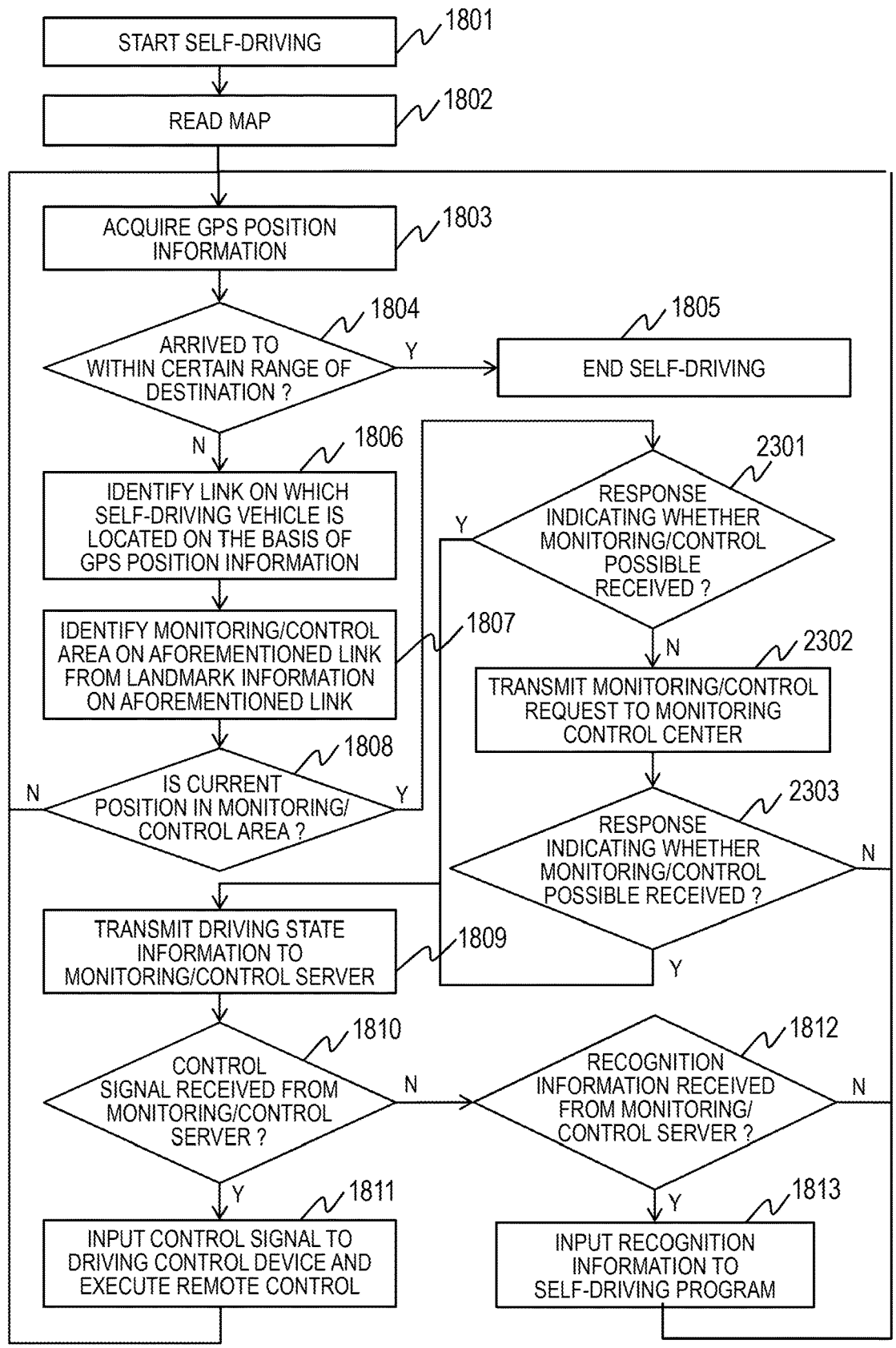
FIG. 23 is a flowchart showing the process by a monitoring/control client software of the self-driving vehicle according to Embodiment 2 of the present invention.

FIG. 23 is a flowchart showing the process by the monitoring/control client software 2101 of the self-driving vehicle 101 according to Embodiment 2 of the present invention.

In FIG. 23, portions of the operation that are the same as FIG. 18, which shows an operation flow of the monitoring/control client software of Embodiment 1, are assigned the same reference characters as FIG. 18, and explanations thereof are omitted.

The monitoring/control client software 2101 compares the landmark information with the current position in step 1808 and confirms whether the self-driving vehicle 101 has entered the monitoring/control area, and if so, the progresses to step 2301. In step 2301, the monitoring/control client software 2101 confirms whether a response indicating that monitoring and control is possible has been received from the monitoring/control server 105. If a response indicating that monitoring and control is possible has been received from the monitoring/control server 105, then the process progresses to step 1809. If a response indicating that monitoring and control is possible has not been received from the monitoring/control server 105, then the process progresses to step 2302.

In step 2302, the monitoring/control client software 2101 transmits a monitoring/control request to the monitoring/control server 105. In the present embodiment, an identifier of the self-driving vehicle 101 as well as the monitoring/control cost associated with the landmark in the vicinity of the self-driving vehicle 101 (that is, when the self-driving vehicle 101 has entered the monitoring/control area of the landmark) are transmitted as content of the monitoring/control request packet. However, if the monitoring/control server 105 identifies the self-driving vehicle 101 and the monitoring/control cost corresponding to a landmark currently in the vicinity can be recognized, then the monitoring/control client software 2101 may transmit any information as content of the monitoring/control request packet.

Next, the monitoring/control client software 2101 confirms the response from the monitoring/control server 105 (2303). If the response from the monitoring/control server 105 is "monitoring/control possible", then the process progresses to step 1809. If the response from the monitoring/control server 105 to which the information was transmitted in step 1809 is "monitoring/control not possible", then the process progresses to step 1803.

<Operation Flow of Monitoring/Control Reception Control Software 2201>

Figure 24:
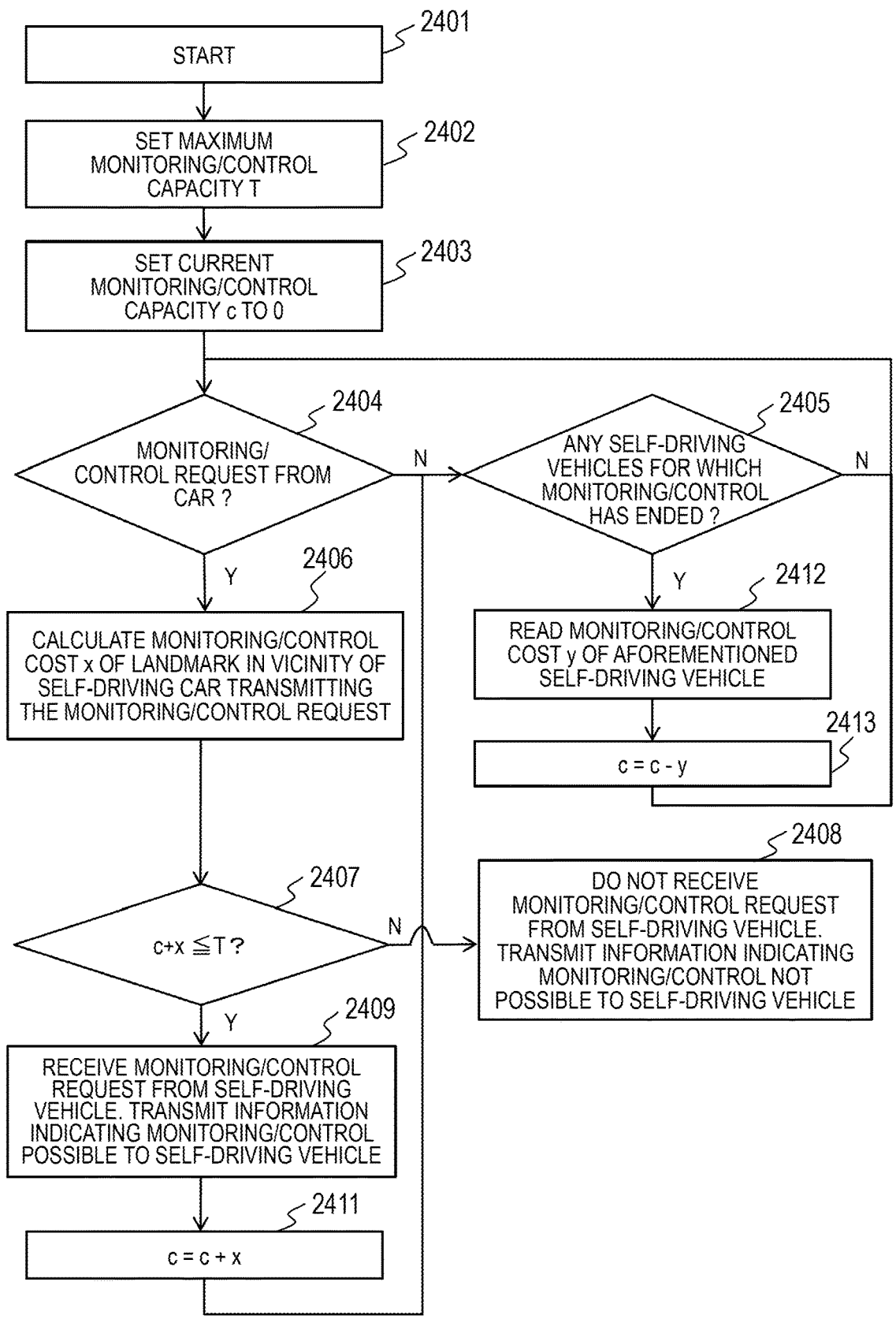
FIG. 24 is a flowchart showing the process by a monitoring/control reception control software of the monitoring/control server according to Embodiment 2 of the present invention.

FIG. 24 is a flowchart showing the process by the monitoring/control reception control software 2201 of the monitoring/control server 105 according to Embodiment 2 of the present invention.

When the monitoring/control reception control software 2201 is started, then a maximum monitoring/control capacity T is set (2202). Next, the monitoring/control reception control software 2201 sets the current monitoring/control capacity c to 0 (that is, clears the capacity) (2203). Next, the monitoring/control reception control software 2201 confirms whether a monitoring/control request from the self-driving vehicle 101 has been received (2404). If monitoring/control request from the self-driving vehicle 101 has not been received, then the process progresses to step 2405. If monitoring/control request from the self-driving vehicle 101 has been received, then the process progresses to step 2406.

In step 2406, the monitoring/control reception control software 2201 calculates the monitoring/control cost x of the landmark in the vicinity of the self-driving vehicle that has transmitted the monitoring/control request, and proceeds to step 2407. In step 2407, the monitoring/control reception control software 2201 calculates c+x, and determines whether $c+x \leq T$ is satisfied. If $c+x \leq T$ is not satisfied, the monitoring/control reception control software 2201 does not receive a monitoring/control request from the self-driving vehicle 101 that has transmitted the monitoring/control request (2408). If $c+x \leq T$ is satisfied, the monitoring/control reception control software 2201 receives a monitoring/control request from the self-driving vehicle 101 that has transmitted the monitoring/control request (2409).

Next, the monitoring/control reception control software 2201 updates the value of c by calculating c+x (2411), and proceeds to step 2405. In step 2405, the monitoring/control reception control software 2201 confirms whether monitoring and control has been completed for any of the self-driving vehicles 101 on which monitoring and control had been performed. Here, as an example of a method for detecting that monitoring and control has ended, there is a method whereby if driving state information has not been received for a given period of time or longer from a self-driving vehicle 101 on which the monitoring/control server 105 is already performing monitoring and control, then it is determined that monitoring and control of the self-driving vehicle 101 has ended.

If the determination results in step 2405 indicate "no" (that is, monitoring and control has not ended for any of the self-driving vehicles 101), then the process progresses to step 2404. If the determination results in step 2405 indicate "yes" (that is, monitoring and control has ended for a self-driving vehicle 101), then the monitoring/control reception control software 2201 reads the monitoring/control cost y of the self-driving vehicle 101 for which monitoring and control has ended, and proceeds to step 2413. In step 2413, the monitoring/control reception control software 2201 updates the value of c by calculating c=c−y, and proceeds to step 2404.

Next, a specific example will be described of a specific process of the self-driving vehicle 101 and the monitoring/control server 105 for when the landmark monitoring/control information table 308 (monitoring/control cost) of FIG. 12 is being used. The maximum monitoring/control capacity T of the monitoring/control server is set to 0.05.

In a state where the current monitoring/control capacity c=0, if the monitoring/control reception control software 2201 has received a monitoring/control request where the self-driving vehicle ID is 1 and the monitoring/control cost is 0.05 (2404), then the monitoring/control cost x of the self-driving vehicle 101 becomes 0.05 (2406). In step 2407, c+x=0+0.05=0.05. Here, T=0.05 and therefore $c+x \leq T$ is satisfied. Thus, the monitoring/control reception control software 2201 receives the monitoring/control request from the self-driving vehicle 101 (2409).

Next, the monitoring/control reception control software 2201 updates the value of c to 0.05 in step 2411. In a state where monitoring and control of the self-driving vehicle 101 with an ID of 1 is being performed (state where c=0.05), if the monitoring/control reception control software 2201 has received a monitoring/control request where the self-driving vehicle ID is 2 and the monitoring/control cost is 0.02 (2404), then the monitoring/control cost x of the self-driving vehicle becomes 0.02 (2406). In step 2407, c+x=0.05+0.02=0.07. Here, T=0.05 and therefore $c+x \leq T$ is not satisfied. Thus, the monitoring/control reception control software 2201 does not receive the monitoring/control request from the self-driving vehicle 101, and transmits to the self-driving vehicle information indicating that monitoring and control is not possible (2408). In this state (where c=0.05), if monitoring and control of the self-driving vehicle with an ID of 1, which was being monitored and controlled, has ended, then step 2405 returns "yes", and the process progresses to step 2412. The monitoring/control cost y of the self-driving vehicle with an ID of 1 is 0.05 (2412). In step 2413, the monitoring/control reception control software 2201 updates the value of c to c−y=0.05−0.05=0. In this state, if the monitoring/control reception control software 2201 receives a monitoring/control request where the self-driving vehicle has an ID of 3 and the monitoring/control cost is 0.02, a monitoring/control request where the self-driving vehicle has an ID of 4 and the monitoring/control cost is 0.02, and a monitoring/control request where the self-driving vehicle has an ID of 5 and the monitoring/control cost is 0.01 in that order, then in any of those cases, it is determined in step 2407 that c+x≤T is satisfied. Thus, the monitoring/control reception control software 2201 receives the monitoring/control request and transmits information to the self-driving vehicle 101 indicating that monitoring and control is possible (2409).

By setting, as the maximum monitoring/control capacity T of the monitoring/control server, the value of the monitoring/control cost for which response is possible according to the manpower, abilities, and the like of the monitoring/control personnel 106, for example, a plurality of self-driving vehicles 101 can be monitored and controlled in a range in which the monitoring/control server 105 and the monitoring/control personnel 106 operating the monitoring/control server can respond (in the above example, this would be a range where c+x≤T is satisfied). That is, according to the present embodiment, in a self-driving system that monitors/controls a self-driving vehicle remotely, it is possible to reduce the cost required for remote monitoring and control while maintaining safety, and additionally, the monitoring/control server can monitor and control a plurality of vehicles.

Embodiment 3

Embodiment 3 of the present invention will be described with reference to FIGS. 25 to 31. Aside from the differences described below, the various components of the system of Embodiment 3 have the same functions as the components of Embodiments 1 and 2 that are displayed in FIGS. 1 to 24 and that are assigned the same reference characters, and thus, descriptions thereof are omitted.

In the present embodiment, the configuration of the self-driving vehicle 101 differs from that of Embodiment 1.

Figure 25:
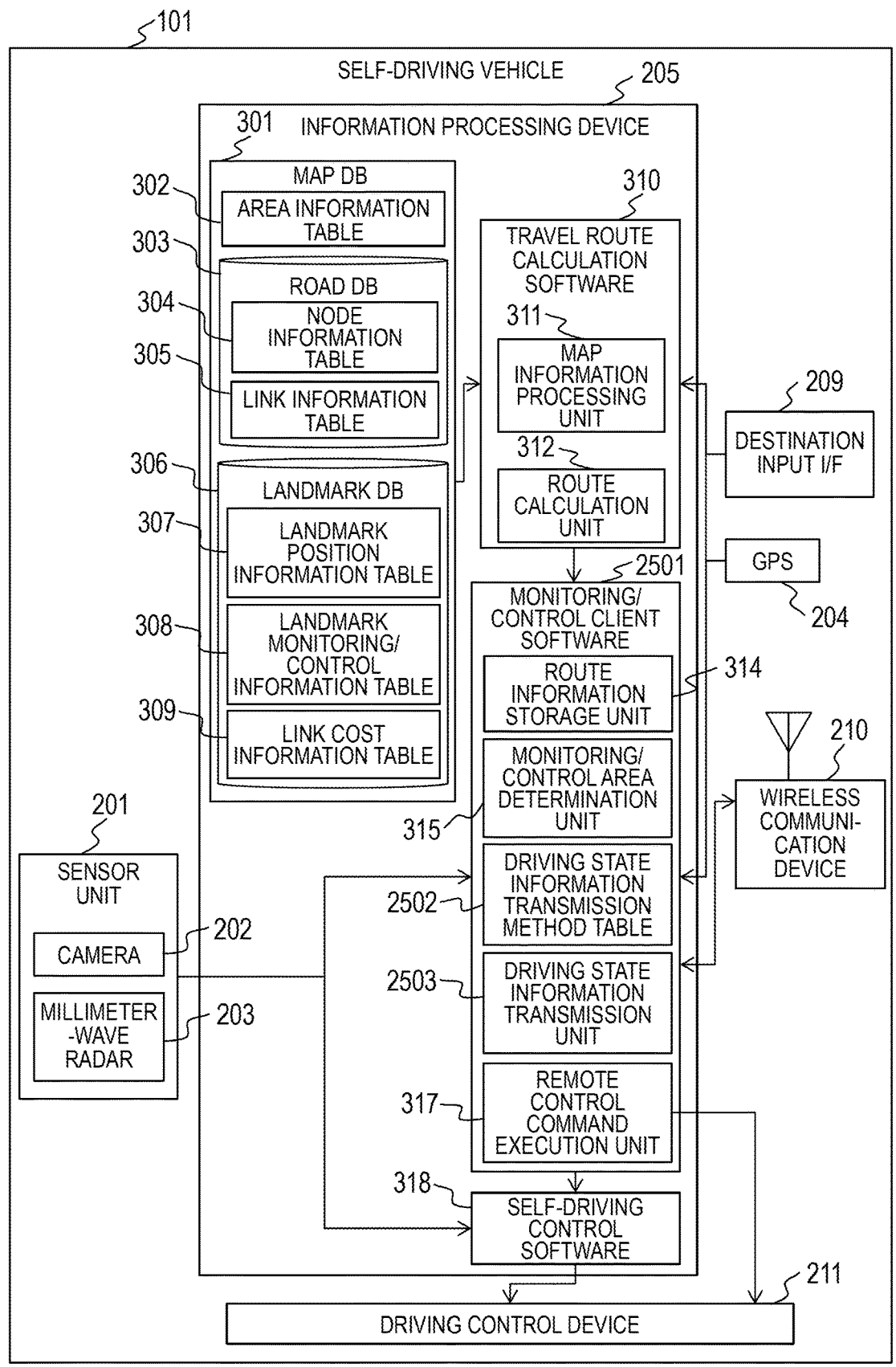
FIG. 25 is a block diagram showing a configuration of the self-driving vehicle according to Embodiment 3 of the present invention.

FIG. 25 is a block diagram showing a configuration of the self-driving vehicle 101 according to Embodiment 3 of the present invention.

Among the components of FIG. 25, portions that are the same as those of FIG. 3 are assigned the same reference characters as FIG. 3 and explanations thereof are omitted. The self-driving vehicle 101 of FIG. 25 has a monitoring/control client software 2501. The monitoring/control client software 2501 is constituted of a driving state information transmission method table 2502 and a driving state information transmission unit 2503 in addition to a route information storage unit 314, a monitoring/control area determination unit 315, and a remote control command execution unit 317. The driving state information transmission method table 2502 is a table that stores the landmark type and a state information transmission method in association with each other. When the driving state information transmission unit 2503 transmits the driving state information, it refers to the driving state information transmission method table 2502, selects a driving state information transmission method corresponding to the landmark type in the vicinity, and transmits the driving state information by the driving state information transmission method.

Figure 26:
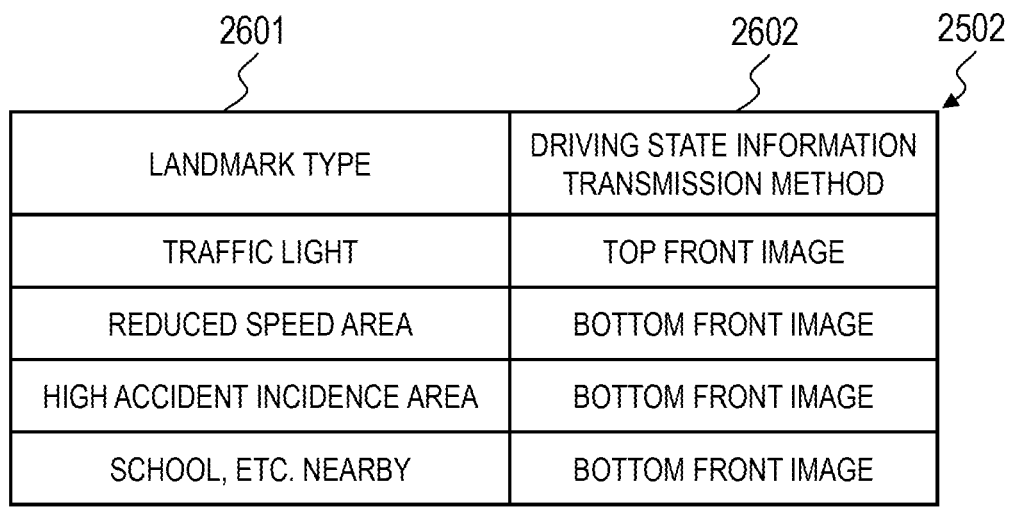
FIG. 26 is a descriptive view showing one example of a driving state information transmission method table stored by the self-driving vehicle 101 according to Embodiment 3 of the present invention.

FIG. 26 is a descriptive view showing one example of a driving state information transmission method table 2502 stored by the self-driving vehicle 101 according to Embodiment 3 of the present invention.

The driving state information transmission method table 2502 is constituted of a landmark type 2601 and a driving state information transmission method 2602. This example indicates that if the landmark type 2601 is a traffic light, then an upper front image is transmitted as the driving state information transmission method 2602, or in other words, that among the images captured by the camera 202, the upper portion of the image captured of the area to the front of the vehicle is transmitted as the driving state information. Also, this example indicates that if the landmark type 2601 is a reduced speed area, then a lower front image is transmitted as the driving state information transmission method 2602, or in other words, that among the images captured by the camera 202, the lower portion of the image captured of the area to the front of the vehicle is transmitted as the driving state information.

Examples in which images are used were indicated above, but the configuration is not limited to using images. The driving state information transmission method table 2502 includes information associating the landmark type 2601 with portions to be transmitted to the monitoring/control server 105 as driving state information, among the information that includes not only images but information acquired by the sensor unit 201 of the self-driving vehicle 101 that has come into close proximity to this landmark type.

<Operation Flow of Monitoring/Control Client Software 2501>

Figure 27:
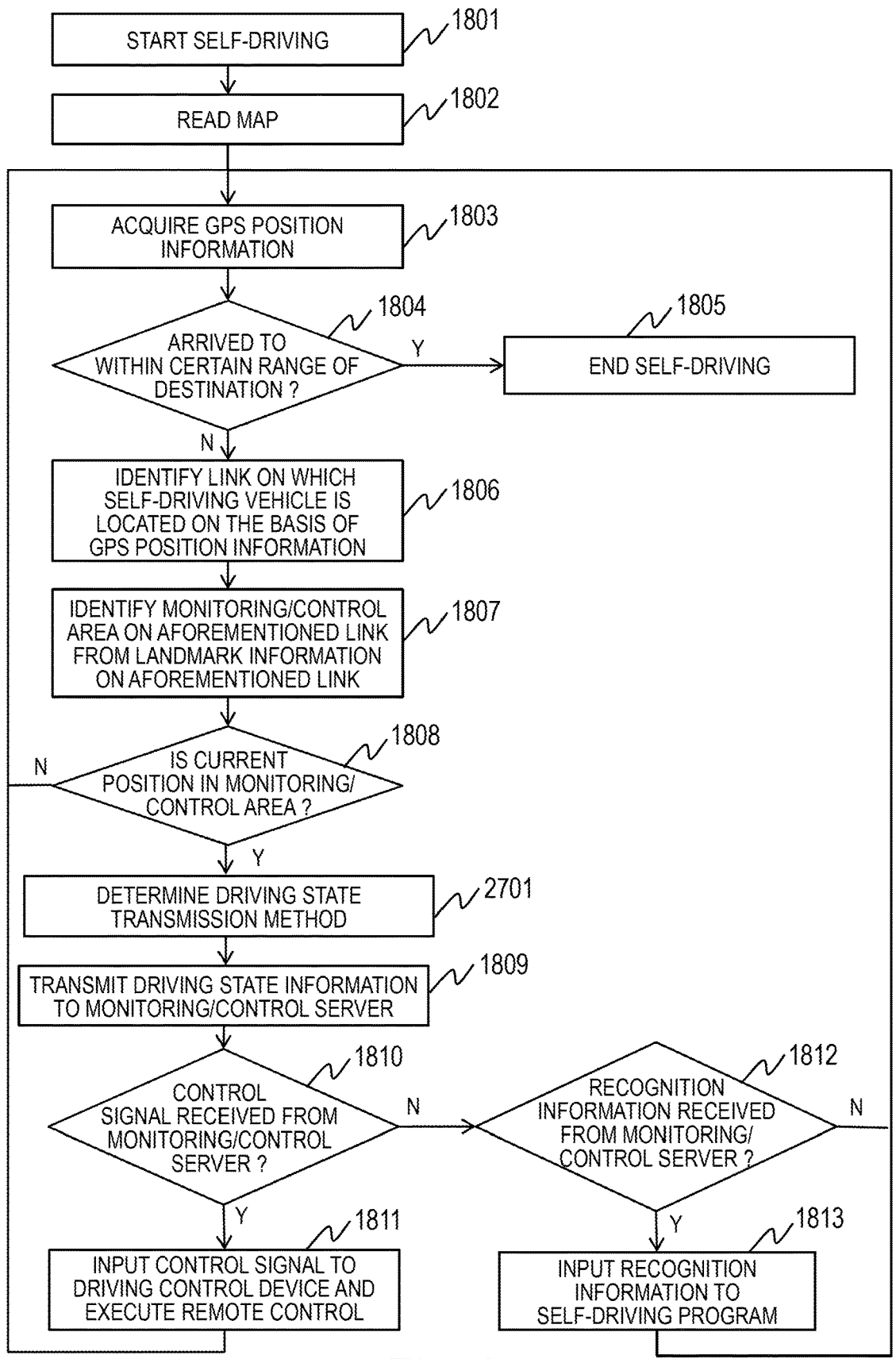
FIG. 27 is a flowchart showing the process by a monitoring/control client software of the self-driving vehicle according to Embodiment 3 of the present invention.

FIG. 27 is a flowchart showing the process by the monitoring/control client software 2501 of the self-driving vehicle 101 according to Embodiment 3 of the present invention.

In FIG. 27, portions that are the same as those of FIG. 18 are assigned the same reference characters as FIG. 18 and explanations thereof are omitted. If the result of step 1808 is "yes", then the monitoring/control client software 2501 refers to the driving state information transmission method table 2502 in step 2701 and determines the driving state transmission method. Then, the monitoring/control client software 2501 executes step 1809.

Next, the driving state information transmission method will be described using a specific example.

Figure 28:
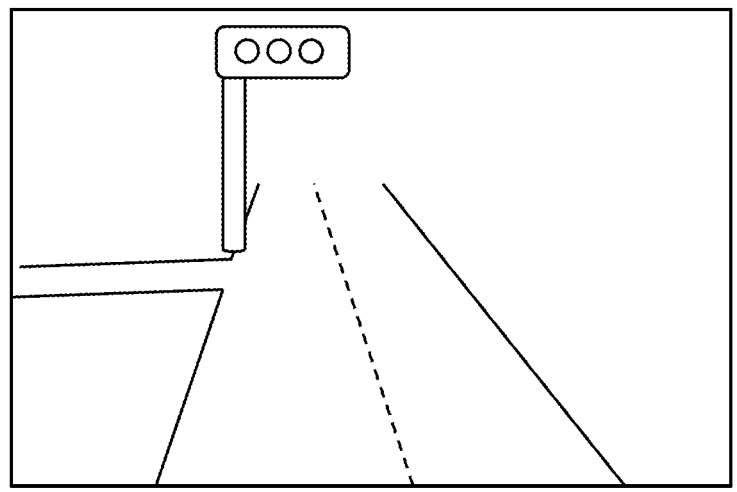
FIG. 28 is a descriptive view showing an example of an image (video) acquired in a monitoring/control area of a landmark that is a traffic light, captured by a camera of the self-driving vehicle according to Embodiment 3 of the present invention.

FIG. 28 is a descriptive view showing an example of an image (video) acquired in the monitoring/control area of a landmark that is a traffic light, captured by the camera 202 of the self-driving vehicle 101 according to Embodiment 3 of the present invention.

When step 2701 is executed for a self-driving vehicle 101 that is traveling in the monitoring/control area of a traffic signal, then the driving state information transmission method 2602 corresponding to the landmark type 2601 is an upper front image. Thus, if the self-driving vehicle 101 is traveling in that area, then in step 1809, the monitoring/control client software 2501 transmits to the monitoring/control server 105 only the upper front image shown in FIG. 29.

Figure 29:
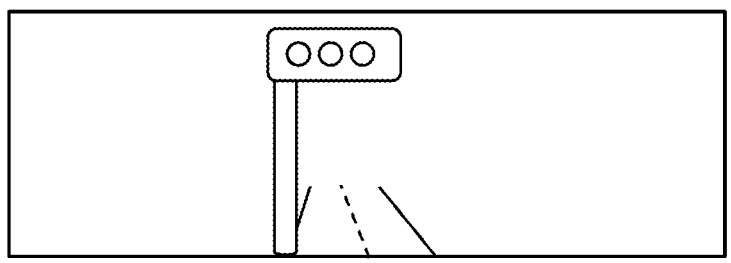
FIG. 29 is a descriptive view showing an example of an image (video) transmitted from inside the monitoring/control area of a landmark that is a traffic light, by the monitoring/control client software of the self-driving vehicle according to Embodiment 3 of the present invention.

FIG. 29 is a descriptive view showing an example of an image (video) transmitted from inside the monitoring/control area of a landmark that is a traffic light, by the monitoring/control client software 2501 of the self-driving vehicle 101 according to Embodiment 3 of the present invention.

The content to be monitored by the monitoring/control server 105 in the vicinity of the traffic light is the traffic light, which is in the area to the upper front of the self-driving vehicle 101, and thus, by transmitting the upper front image in which the traffic light was captured and not transmitting the rest of the image, it is possible to reduce the amount of data being transmitted while ensuring safety, thereby reducing communication costs.

Figure 30:
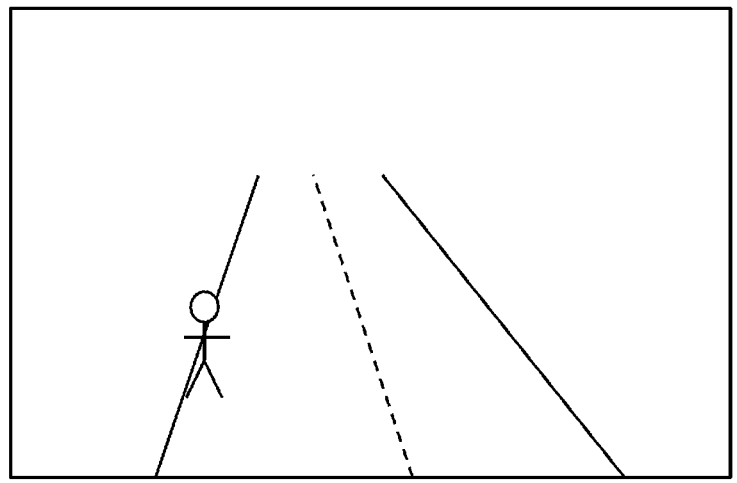
FIG. 30 is a descriptive view showing an example of an image (video) acquired in the monitoring/control area of a landmark that is a reduced speed area, captured by the camera of the self-driving vehicle according to Embodiment 3 of the present invention.

FIG. 30 is a descriptive view showing an example of an image (video) acquired in the monitoring/control area of a landmark that is a reduced speed area, captured by the camera 202 of the self-driving vehicle 101 according to Embodiment 3 of the present invention.

When step 2701 is executed for a self-driving vehicle 101 that is traveling in the monitoring/control area of a reduced speed area, then the driving state information transmission method 2602 corresponding to the landmark type 2601 is a lower front image. Thus, if the self-driving vehicle 101 is traveling in that area, then in step 1809, the monitoring/control client software 2501 transmits to the monitoring/control server 105 only the lower front image shown in FIG. 31.

Figure 31:
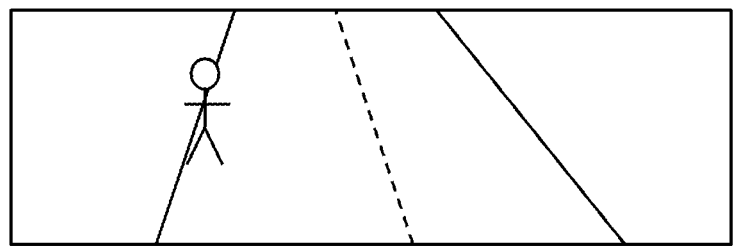
FIG. 31 is a descriptive view showing an example of an image (video) transmitted from inside the monitoring/control area of a landmark that is a reduced speed area, by the monitoring/control client software of the self-driving vehicle according to Embodiment 3 of the present invention.

FIG. 31 is a descriptive view showing an example of an image (video) transmitted from inside the monitoring/control area of a landmark that is a reduced speed area, by the monitoring/control client software 2501 of the self-driving vehicle 101 according to Embodiment 3 of the present invention.

The monitoring/control server 105 should perform monitoring for pedestrians and the like who lunge out in front of the vehicle in the vicinity of the reduced speed area, which is in the area to the lower front of the self-driving vehicle 101, and thus, by transmitting the lower front image and not transmitting the rest of the image, it is possible to reduce the amount of data being transmitted while ensuring safety, thereby reducing communication costs.

As described above, in the present embodiment, information that is not necessary for monitoring and control, depending on the landmark type according to the driving state information transmission method table 2502, is not transmitted from the self-driving vehicle 101, and thus, the amount of data transmitted between the self-driving vehicle 101 and the monitoring/control server 105 is reduced. Thus, according to the present embodiment, in a self-driving system that monitors/controls a self-driving vehicle remotely, it is possible to reduce the communication cost, among the costs required for monitoring and control, while ensuring safety.

The present invention is not limited to the embodiment above, and includes various modification examples. The embodiment above was described in detail in order to explain the present invention in an easy to understand manner, but the present invention is not necessarily limited to including all configurations described, for example. It is possible to replace a portion of the configuration of one embodiment with the configuration of another embodiment, and it is possible to add to the configuration of the one embodiment a configuration of another embodiment. Furthermore, other configurations can be added or removed, or replace portions of the configurations of the respective embodiments.

Some or all of the respective configurations, functions, processing units, processing means, and the like can be realized with hardware such as by designing an integrated circuit, for example. Additionally, the respective configurations, functions, and the like can be realized by software by the processor interpreting programs that execute the respective functions and executing such programs. Programs, data, tables, files, and the like realizing respective functions can be stored in a storage device such as a non-volatile semiconductor memory, a hard disk drive, or a solid state drive (SSD), or in a computer-readable non-transitory data storage medium such as an IC card, an SD card, or a DVD.

Control lines and data lines regarded as necessary for explanation have been described, but not all control lines and data lines in the product have necessarily been shown. In reality, almost all components can be thought of as connected to each other.

What is claimed is:

1. A moving body, comprising:
a movement control unit that controls movement of the moving body;
a storage unit that stores map information including information pertaining to links corresponding to roads and nodes connecting the links, and target object information that associates the links, a target object, and an indicator with one another, the indicator indicates a cost value for monitoring movement of the movement body to determine whether self-driving of the moving body by the movement control unit can be continued;
a route calculation unit that:
receives a starting point and the ending point;
identifies a plurality of routes from the starting point to the ending point, each of which includes one or more of the links, on the basis of the map information;
calculates, for each of the plurality of routes, a total value of the indicators to determine whether self-driving of the moving body can continue, for one or more of the target objects corresponding to said one or more of the links, on the basis of the map information and the target object information; and
selects as a movement route, a route with a total value of the indicators below a prescribed reference parameter; and
a monitoring/control unit that transmits information to a server inquiring whether self-driving of the moving body can be continued if the moving body has come into close proximity to the target object, the monitoring/control unit configured to:
input a control signal to the movement control unit and cause the movement control unit to execute driving control of the moving body according to the control signal in response to receiving the control signal for controlling the moving body from the server, and
cause the movement control unit to continue self-driving of the moving body on the selected movement route when a response including the control signal for controlling the moving body is not received from the server.

2. The moving body according to claim 1,
wherein the prescribed reference parameter is a smallest total value for the indicators from among the plurality of routes.

3. The moving body according to claim 1,
wherein the cost for monitoring the moving body includes at least one of a length of time for monitoring movement of the moving body, and a degree of probability that control based on the control signal will be executed as a result of performing said monitoring.

4. The moving body according to claim 1,
the monitoring/control unit further inputs recognition results of a state of an area surrounding the moving body to the movement control unit and causes the movement control unit to continue self-driving using the recognition results in response to receiving the control signal for controlling the moving body from the server.

5. The moving body according to claim 1,
wherein the target object information further includes information associating the target object with a monitoring range, the monitoring range being a positional area over which monitoring and control is executed and
wherein the monitoring/control unit determines that the moving body has come into close proximity to the target object when a current location of the moving body is included in the monitoring range of the target object.

6. The moving body according to claim 1,
wherein the monitoring/control unit determines whether a response indicating that monitoring of the moving body is possible has been received when the moving body has come into close proximity to any of the target objects,
wherein the monitoring/control unit transmits a request for monitoring the moving body when a response indicating that monitoring of the moving body is possible has not been received, and
wherein the monitoring/control unit transmits information for inquiring as to whether self-driving of the moving body can be continued when a response indicating that monitoring of the moving body is possible has been received.

7. The moving body according to claim 1, further comprising:
a sensor unit that acquires information pertaining to a state of an area surrounding the moving body,
wherein the information for inquiring as to whether self-driving of the moving body can be continued includes the information acquired by the sensor unit.

8. The moving body according to claim 7,
wherein the target object information includes information associating the target object with information indicating the portion of the information acquired by the sensor unit that should be transmitted when inquiring whether self-driving of the moving body can be continued, and
wherein the monitoring/control unit transmits the indicated portion of the information, from among the information acquired by the sensor unit, that was associated with the target object to which the moving body came into close proximity when the moving body comes into close proximity to any of the target objects.

* * * * *